US012547738B2

(12) United States Patent
Zhou et al.

(10) Patent No.: US 12,547,738 B2
(45) Date of Patent: Feb. 10, 2026

(54) METHOD AND DEVICE FOR DETECTING SECURITY OF INTERNET OF THINGS DATA OF MARKET TRANSACTION, AND ELECTRONIC APPARATUS

(71) Applicant: Zhongshan Power Supply Bureau of Guangdong Power Grid Co Ltd., Zhongshan (CN)

(72) Inventors: Xiangfeng Zhou, Zhongshan (CN); Chunyuan Cai, Zhongshan (CN); Yongjian Li, Zhongshan (CN); Lifei Li, Zhongshan (CN); Weixia Jian, Zhongshan (CN); Huibin Zhou, Zhongshan (CN); Hua Li, Zhongshan (CN); Zhenjiang Chen, Zhongshan (CN); Ying Zhang, Zhongshan (CN); Yufeng Chen, Zhongshan (CN); Junfeng Wei, Zhongshan (CN)

(73) Assignee: Zhongshan Power Supply Bureau of Guangdong Power Grid Co Ltd., Zhongshan (CN)

( * ) Notice: Subject to any disclaimer, the term of this patent is extended or adjusted under 35 U.S.C. 154(b) by 0 days.

(21) Appl. No.: 18/790,417

(22) Filed: Jul. 31, 2024

(65) Prior Publication Data
US 2025/0272413 A1    Aug. 28, 2025

(30) Foreign Application Priority Data
Feb. 22, 2024    (CN) .......................... 202410196578.2

(51) Int. Cl.
G06F 21/00    (2013.01)
G06F 21/60    (2013.01)
G06Q 40/04    (2012.01)

(52) U.S. Cl.
CPC ............. *G06F 21/60* (2013.01); *G06Q 40/04* (2013.01)

(58) Field of Classification Search
CPC .... G06Q 50/06; G06Q 40/04; G06Q 30/0201; G06F 17/18; G06F 21/60; H04L 47/70;
(Continued)

(56) References Cited

U.S. PATENT DOCUMENTS

2024/0267737 A1* 8/2024 Messous ............. H04W 12/122
2025/0300904 A1* 9/2025 Fortkort ................. H04L 67/12

FOREIGN PATENT DOCUMENTS

| CN | 110445801 A | 11/2019 |
| CN | 115694956 A | 2/2023 |
| CN | 116468556 A | 7/2023 |

OTHER PUBLICATIONS

Corresponding CN search report issued on Apr. 15, 2024 in CN 202410196578.2.

* cited by examiner

*Primary Examiner* — William A Corum, Jr.
(74) *Attorney, Agent, or Firm* — SCULLY, SCOTT, MURPHY & PRESSER, P.C.

(57) ABSTRACT

A method and device for detecting security of Internet of Things data of market transaction, and an electronic apparatus are provided. The method includes: calculating at least one first trapezoidal fuzzy set having a number of attacks of data; calculating at least one second trapezoidal fuzzy set of an error rate of the data; calculating at least one third trapezoidal fuzzy set of a repetition rate of the data; calculating at least one fourth trapezoidal fuzzy set of miss rate of the data; determining a security detection value according to the first trapezoidal fuzzy set; determining a false detection value according to the second trapezoidal fuzzy set, the third trapezoidal fuzzy set and the fourth trapezoidal fuzzy set;

(Continued)

and determining security of the Internet of Things data of the market transaction according to the security detection value and the false detection value.

18 Claims, 4 Drawing Sheets

(58) Field of Classification Search
CPC .......... H04L 67/12; G06N 7/02; G16Y 10/35; G16Y 10/45; G16Y 20/30; G16Y 30/10; G16Y 40/50

See application file for complete search history.

METHOD AND DEVICE FOR DETECTING SECURITY OF INTERNET OF THINGS DATA OF MARKET TRANSACTION, AND ELECTRONIC APPARATUS

CROSS-REFERENCE TO RELATED APPLICATION

The disclosure claims the benefit of priority to Chinese Patent Application No. 202410196578.2, filed with the Chinese Patent Office on Feb. 22, 2024 and entitled "Method and device for detecting security of Internet of Things data of market transaction, computer-readable storage medium and electronic apparatus", which is incorporated in its entirety herein by reference.

TECHNICAL FIELD

The present application relates to the technical field of power systems and automation thereof, and in particular, to a method and device for detecting security of Internet of Things data of market transaction, a computer-readable storage medium and an electronic apparatus.

BACKGROUND

At present, domestic and foreign research on the ubiquitous power Internet of Things network attack can refer to fewer materials, and research on a power physical information system is partially overlapped with the ubiquitous power Internet of Things. Security problems, such as privacy, authorization, authentication, access control, system configuration, information storage and management, are major challenges in the Internet of Things environment. For example, a perception layer constructed by various smart devices has a high risk of network attack due to its wide and large number of features, thereby resulting in a light impact on service interruption, and seriously or even damaging the key.

The three protection lines of the electric power system that are safe and stable and the safety protection principles of "secure partition, network professional, horizontal isolation, and longitudinal authentication" have gradually failed to adapt to the new attack mode of network attack, and the inherent grid "N−1" standard also cannot satisfy many scenarios of information attack. The development of the Internet of Things largely depends on the solving of the security problem. For a support platform of the Internet of Things application, due to the limited software/hardware resources of a device, a big data security sharing problem oriented to "edge computing" becomes a key problem to be solved urgently. Despite the research on data security access control and trust mechanisms at present, there are few research on applying a data security access control mechanism based on a combination of the trust mechanism and ABAC policy idea to an Internet of Things farmland environment data sharing system to realize secure sharing of data of the Internet of Things, and the farmland environment data in the Internet of Things has a security sharing problem.

Therefore, how to solve the problem of secure sharing of farm environment data in the Internet of Things is an urgent problem to be solved at present.

SUMMARY

The present application mainly aims to provide a method and device for detecting security of Internet of Things data of market transaction, a computer-readable storage medium and an electronic apparatus.

In order to achieve the described object, according to one aspect of the present application, provided is a method for detecting security of Internet of Things data of market transaction, comprising: calculating at least one first trapezoidal fuzzy set having a number of attacks of data, the data being sent by a market transaction main body within a target time period to Internet of Things; calculating at least one second trapezoidal fuzzy set of an error rate of the data; calculating at least one third trapezoidal fuzzy set of a repetition rate of the data; calculating at least one fourth trapezoidal fuzzy set of miss rate of the data; determining a security detection value according to the first trapezoidal fuzzy set; determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

Optionally, calculating the first trapezoidal fuzzy set having the number of attacks of data, comprises: calculating nine first trapezoidal fuzzy sets, the number of attacks of the nine first trapezoidal fuzzy setting to low to high, of the number of attacks of the data sent by the marketing transaction entity to the Internet of things within the target time period as $N_{ADi}=(N_{ADi1}, N_{ADi2}, N_{ADi3}, N_{ADi4}; k_{DAi})$, wherein i=1, 2, . . . , 9, 1 $N_{ADi}$ is an ith first trapezoidal fuzzy set having the number of attacks in the data sent by the market transaction main body to the Internet of Things, $N_{ADi1}$ is a power generation power and first offer data of the $i^{th}$ first trapezoidal fuzzy set, and $N_{ADi2}$ is a frequency modulation power and second offer data of the $i^{th}$ first trapezoidal fuzzy set, $N_{ADi3}$ is a peak modulation power and third offer data of the $i^{th}$ first trapezoidal fuzzy set, and $N_{ADi4}$ is a voltage regulation power and fourth offer data of the $i^{th}$ first trapezoidal fuzzy set, $k_{DAi}$ is a membership coefficient of the $i^{th}$ first trapezoidal blur set.

Optionally, calculating a second trapezoidal fuzzy set of error rates of the data comprises: calculating the second trapezoidal fuzzy setting to low to high error rates of the data sent by the marketing transaction entity to the Internet of things within the target time period as $k_{ei}=(k_{ei1}, k_{ei2}, k_{ei3}, k_{ei4}; k_{eki})$, wherein i=1, 2, . . . , 9, $k_{ei}$ is an ith second trapezoidal fuzzy set of an error rate in the data sent by the market transaction main body to the Internet of Things, $k_{ei1}$ is the power generation power and offer data in the ith second trapezoidal fuzzy set, and $k_{ei2}$ is the frequency modulation power and offer data in the ith second trapezoidal fuzzy set, $k_{ei3}$ is the peak tuning power and offer data in the ith second trapezoidal blur set, and $k_{ei4}$ is the peak tuning power and offer data in the ith second trapezoidal blur set, k eki is a membership coefficient of the ith second trapezoidal blur set.

Optionally, calculating a third trapezoidal fuzzy set of the repetition rate of the data comprises: calculating the third trapezoidal fuzzy set with nine fuzzy uncertainties setting to low to high repetition rates of the data sent by the marketing transaction entity during the target time period to the Internet of things, as $k_{Ri}=(k_{Ri1}, k_{Ri2}, k_{Ri3}, k_{Ri4}; k_{Rki})$, wherein i=1, 2, . . . , 9, $k_{Ri}$ is an ith third trapezoidal fuzzy set of a repetition rate in the data sent by the market transaction main body to the Internet of Things, $k_{Ri1}$ is the power generation power and offer data in the ith third trapezoidal fuzzy set, and $k_{Ri2}$ is the frequency modulation power and offer data in the ith third trapezoidal fuzzy set, $k_{Ri3}$ peak modulation power and offer data in the ith said third trapezoidal fuzzy set, $k_{Ri4}$ is the peak modulation power and offer data in the ith said third trapezoidal fuzzy set, $k_{Rki}$ is a membership coefficient of the ith third-trapezoidal fuzzy set.

Optionally, calculating a fourth trapezoidal fuzzy set of miss rates of the data comprises: calculating the fourth trapezoidal fuzzy setting to low to high miss rates of the data sent by the marketing transaction entity during the target time period to the Internet of things as $k_{Li}=(k_{Li1}, k_{Li2}, k_{Li3}, k_{Li4}; k_{Lki})$ wherein i=1, 2, ..., 9, $k_{Li1}$ is the power generation power and offer data of the ith fourth trapezoidal fuzzy set, $k_{Li2}$ is the frequency modulation power and offer data in the ith fourth trapezoidal fuzzy set, and $k_{Li3}$ is the peak modulation power and offer data in the ith fourth trapezoidal fuzzy set, $k_{Li4}$ is the regulated power and offer data in the ith fourth-trapezoidal fuzzy set, and $k_{Lki}$ is the membership coefficient of the ith fourth-trapezoidal fuzzy set.

optionally, determining the security detection value according to the first trapezoid ambiguity set, and determining the false detection value according to the second trapezoid ambiguity set, the third trapezoid ambiguity set, and the fourth trapezoid ambiguity set comprises: determining the security detection value according to a trapezoidal fuzzy formula $$k_A = \frac{N_{AD}}{N_{TD} + N_{AD}},$$

in which kA represents the security detection value and $k_A \geq 0$, $N_{TD}$ represents a quantity of real data sent by the marketing transaction entity to the Internet of things, and $N_{AD}$ represents the first trapezoidal fuzzy set; determining a false detection fuzzy set by a formula $$N_{FD} = N_D \sum_{i=1}^{N_{RP}} \left( k'_{eC} k'_{eL} \sum_{i=1}^{9} E[k_{ei}] + k'_{RC} k'_{RL} \sum_{i=1}^{9} E[k_{Ri}] + k'_{LC} k'_{LL} \sum_{i=1}^{9} E[k_{Li}] \right),$$

and determining the false detection value according to a formula $$k_F = \frac{N_{FD}}{N_{TD} + N_{FD}},$$

wherein $N_{FD}$ represents the false detection fuzzy set, $N_D$ represents a quantity of the data sent by the marketing transaction subject to the Internet of Things, $k_{eC}^t$ is a first membership coefficient of the second set of trapezoidal ambiguous sets, $k_{eL}^t$ is a second membership coefficient of the second set of trapezoidal ambiguous sets, $E(k_{ei})$ is a mathematical expectation of the second trapezoidal fuzzy set, $k_{RC}^t$ is a first membership coefficient of the third trapezoidal fuzzy set, $k_{RL}^t$ is a second membership coefficient of the third set of trapezoidal blur values, $E(k_{Ri})$ is a mathematical expectation of the third set of trapezoidal blur values, KLC is a first membership coefficient of the fourth set of trapezoidal ambiguous sets, $k_{LL}^t$ is a second membership coefficient of the fourth set of trapezoidal ambiguous sets, $E(k_{Li})$ is a mathematical expectation of the fourth trapezoidal fuzzy set, t is a t-th target time period and t=1, 2, ..., $N_{RP}$, $k_F$ indicates the false detection value and $k_F \leq 0$, elements of $N_{FD}$ indicate a quantity of false data sent to the Internet of Things by the market transaction body.

Optionally, determining the security of the Internet of Things data of the market transaction according to the security detection value and the false detection value comprises: in a case that both the security detection value and the false detection value are 0, determining that the Internet of Things data of the market transaction is secure; in a case that the security detection value is greater than 0 and the false detection value is 0, determining that there is a data attack in the Internet of Things data of the market transaction and there is no false data; and in a case that the security detection value is zero and the false detection value is greater than zero, determining that no data attack exists in the Internet of Things data of the market transaction and false data exists in the Internet of Things data of the market transaction.

According to another aspect of the present application, provided is a device for detecting security of Internet of Things data of market transaction, characterized by comprising: a first calculation unit, configured to calculate at least one first trapezoidal fuzzy set having a number of attacks of data, the data being sent by a market transaction main body within a target time period to Internet of Things; a second calculation unit, configured to calculate at least one second trapezoidal fuzzy set of an error rate of the data sent to the Internet of Things by the market transaction subject in the target time period; a third calculation unit, configured to calculate at least one third trapezoidal fuzzy set of a repetition rate of the data to the Internet of things by the market transaction subject of the target time period; a fourth calculation unit, configured to calculate at least one fourth trapezoidal fuzzy set of miss rate of the data sent to the Internet of Things by the marketing transaction subject in the target time period; a determination unit, configured to determine a security detection value according to the first trapezoidal fuzzy set; determine a false detection value according to the second trapezoidal fuzzy set, the third trapezoidal fuzzy set and the fourth trapezoidal fuzzy set; and determining the security of the Internet of Things data of the market transaction according to the security detection value and the false detection value.

According to another aspect of the present application, a computer-readable storage medium is provided. The computer-readable storage medium comprises a stored program. When the program runs, the computer-readable storage medium is controlled to execute any one of the security detection methods.

According to another aspect of the present application, there is provided an electronic apparatus, comprising: one or more processors, a memory, and one or more programs, wherein the one or more programs are stored in the memory and configured to be executed by the one or more processors, and the one or more programs comprise instructions for executing any one of the security detection methods.

Figure 1:
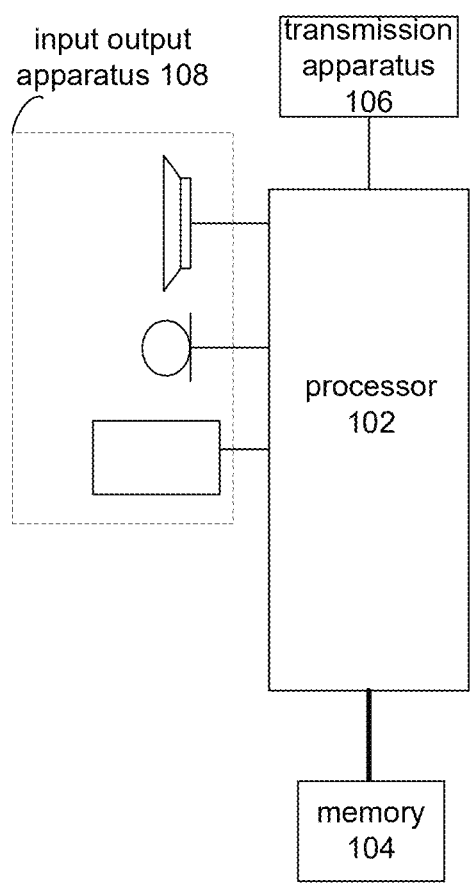
FIG. 1 shows a hardware structure block diagram of a mobile terminal for executing a method for detecting security of Internet of Things data of a market transaction according to an embodiment of the present application.

The figures include the following reference signs:
102: processor; 104: storage; 106: transmission equipment; 108: an input/output device.

DETAILED DESCRIPTION OF THE EMBODIMENTS

It is important to note that the embodiments of the present disclosure and the characteristics in the embodiments can be combined under the condition of no conflicts. The present disclosure will be described below with reference to the drawings and embodiments in detail.

To make persons skilled in the art better understand the solutions of the present application, the following clearly and completely describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall belong to the scope of protection of the present application.

It should be noted that the terms "first" and "second" in the specification, claims, and accompanying drawings of the present application are used to distinguish similar objects, and are not necessarily used to describe a specific sequence or order. It should be understood that the data so used may be interchanged where appropriate for the embodiments of the present application described herein. In addition, the terms "include" and "have", and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

A power Internet of Things around various links of a power system, and fully applies advanced communication technologies, such as artificial intelligence and mobile interconnection, and modern information technologies, so as to achieve universal interconnection among various links of the power system and human-computer interaction. The intelligent service system thereof is convenient and flexible in application, highly efficient in information processing and comprehensive in feature state sensing. With the continuous development of intelligent power grid construction, the automation degree of an electric power system is generally at a relatively high level, and the number of sensors, the scale of an information network and the number of decision units are greatly increased. Compared with current power systems, a prominent advantage of the ubiquitous power Internet of Things lies in using a large number of sensors and a new generation of power communication network, so as to realize full-process panoramic holographic perception.

Nowadays, the electric power industry has gradually entered into a new digitalized and comprehensive interconnection era, and an electric power information network plays an important role in the entire electric power system, which, like modern network technology, is also developing towards diversification, complicating and comprehensiveness. Analyzing network attacks in the ubiquitous power Internet of Things has been significantly helpful in enhancing stable operation of a power grid, improving a fault emergency response capability, and predicting a trend of development of a security situation.

The three protection lines of the electric power system that are safe and stable and the safety protection principles of "secure partition, network professional, horizontal isolation, and longitudinal authentication" have gradually failed to adapt to the new attack mode of network attack, and the inherent grid "N-1" standard also cannot satisfy many scenarios of information attack. The development of the Internet of Things greatly depends on the solving of a security problem. The present application sets forth relevant concepts of the ubiquitous power Internet of Things and builds an architecture. A malicious network attack process is analyzed by means of a power-on and power-off event, and classification, application scenarios, a protection system and a future researchable direction of a network attack are summarized in the environment of the ubiquitous power Internet of Things, so as to open a new route for a more secure operation of a power grid, more exquisite management, more accurate investment, and a higher quality service. With the development of the universal interconnect, according to the prediction of the global cloud index of Cisco, as the Internet of Things generates 45% of data by the year 2019, the "edge calculation" will become a support platform of the emerging universal interconnect application. Because the software and hardware resources of the device are limited, the problem of large-data security sharing oriented to the "edge calculation" becomes a key problem to be solved urgently. In this regard, some research efforts have been made, for example, development of an open environment such as cloud computing has been proposed, which brings a security problem of a cloud terminal, thereby increasing unreliability of user data access behavior in the cloud. In the research of a user behavior trust mechanism, a trust negotiation mechanism based on a similar trust degree in a cloud environment, an access control model based on a plurality of trusted features of a user, an access control model based on a trust calculation, an access control model based on role and trust, and a design of a cloud security access control model based on user behavior trust have been proposed in the literature. The proposed model introduces a fuzzily uniform matrix-based hierarchical analysis method as a user behavior evaluation method to evaluate the user behavior confidence degree. In research of data access control strategies, role-based security access control models have been applied to data access control of agricultural information systems. However, it is considered that a conventional role-based access control system has problems such as a static access control management mode, a high overhead for maintaining permission information, and low efficiency for querying permission information. Therefore, a concept of using an attribute-based access control policy to solve a system security problem is proposed. Currently, the ABAC policy has been studied in different aspects in the existing literature, for example, the entity attribute discovery mechanism of the ABAC may be implemented by a perturbation algorithm based on the neighborhood concealment and an improved privacy preserving classification mining method based on singular value decomposition data perturbation; the multi-domain collaboration mechanism of the ABAC may be implemented by an attribute-based policy synthesis algebraic model and a binary sequence set-based policy synthesis algebraic framework; the permission update and revocation mechanism of the ABAC may be implemented by a ciphertext policy attribute-based encryption scheme with a constant ciphertext length and a directly revocable attribute, and an attribute-based encryption scheme that supports attribute revocation and a constant ciphertext length.

Despite the research on the data security access control and trust mechanism at present, there are few research on applying the data security access control mechanism based on the combination of the trust mechanism and the ABAC policy concept to the data sharing system in the Farmland Installment of the Internet of Things to realize secure sharing of data in the Internet of Things. Therefore, an Internet of Things farmland environmental data sharing system is used as an application, and user identity authentication and data security access control of the farmland environmental data sharing system are realized by using a model, thereby solving the problem of farmland environmental data security sharing in the Internet of Things.

As introduced in the background art, there is a security problem in Internet of Things data of market transaction in the prior art. In order to solve the security problem in Internet of Things data of market transaction, embodiments of the present application provide a method and device for detecting security of Internet of Things data of market transaction, a computer-readable storage medium and an electronic apparatus.

The following clearly and completely describes the technical solutions in the embodiments of the present invention with reference to the accompanying drawings in the embodiments of the present invention.

The method embodiments provided in the embodiments of the present application may be implemented in a mobile terminal, a computer terminal, or a similar computing device. Taking the operation on a mobile terminal as an example, FIG. 1 is a hardware structure block diagram of a mobile terminal of a method for detecting security of Internet of Things data of market transaction according to an embodiment of the present invention. As shown in FIG. 1, the mobile terminal may include one or more (only one is shown in FIG. 1) processors 102 (the processors 102 may include, but are not limited to, a processing apparatus such as a microprocessor MCU or a programmable logic device FPGA) and a memory 104 for storing data, wherein the mobile terminal can further include a transmission device 106 and an input/output device 108 for a communication function. A person of ordinary skill in the art may understand that the structure shown in FIG. 1 is merely exemplary, which does not limit the structure of the foregoing mobile terminal. For example, the mobile terminal may further include more or less components than shown in FIG. 1, or have a different configuration from that shown in FIG. 1.

The memory 104 may be used for storing a computer program, for example, a software program and module of application software, such as a computer program corresponding to the method for detecting security of market transaction Internet of Things data in the embodiments of the present invention; and the processor 102 runs the computer program stored in the memory 104, so as to execute various functional applications and data processing, i.e. to realize the described method. Memory 104 may include high-speed random access memory, and may also include non-volatile memory, such as one or more magnetic storage devices, flash memory, or other non-volatile solid-state memory. In some instances, memory 104 may further include memory remotely located with respect to processor 102, which may be connected to mobile terminals over a network. Examples of such networks include, but are not limited to, the Internet, intranets, local area networks, mobile communication networks, and combinations thereof. The transmitting device 106 is used to receive or transmit data via a network. Specific examples of the described network may include a wireless network provided by a communication provider of the mobile terminal. In one example, the transfer device 106 may comprise a network interface controller (NIC) that may be coupled to other network devices via a base station to communicate with the Internet. In one example, the transmission device 106 may be a radio frequency (RF) module for communicating wirelessly with the Internet.

The present embodiment provides a security detection method for market transaction Internet of Things data running on a mobile terminal, computer terminal or similar computing device. It should be noted that the steps shown in the flowchart of the figure can be executed in a computer system such as a group of computer executable instructions. Although the logic order is shown in the flowchart, in some cases, the shown or described steps can be executed in an order different from that described here.

Figure 2:
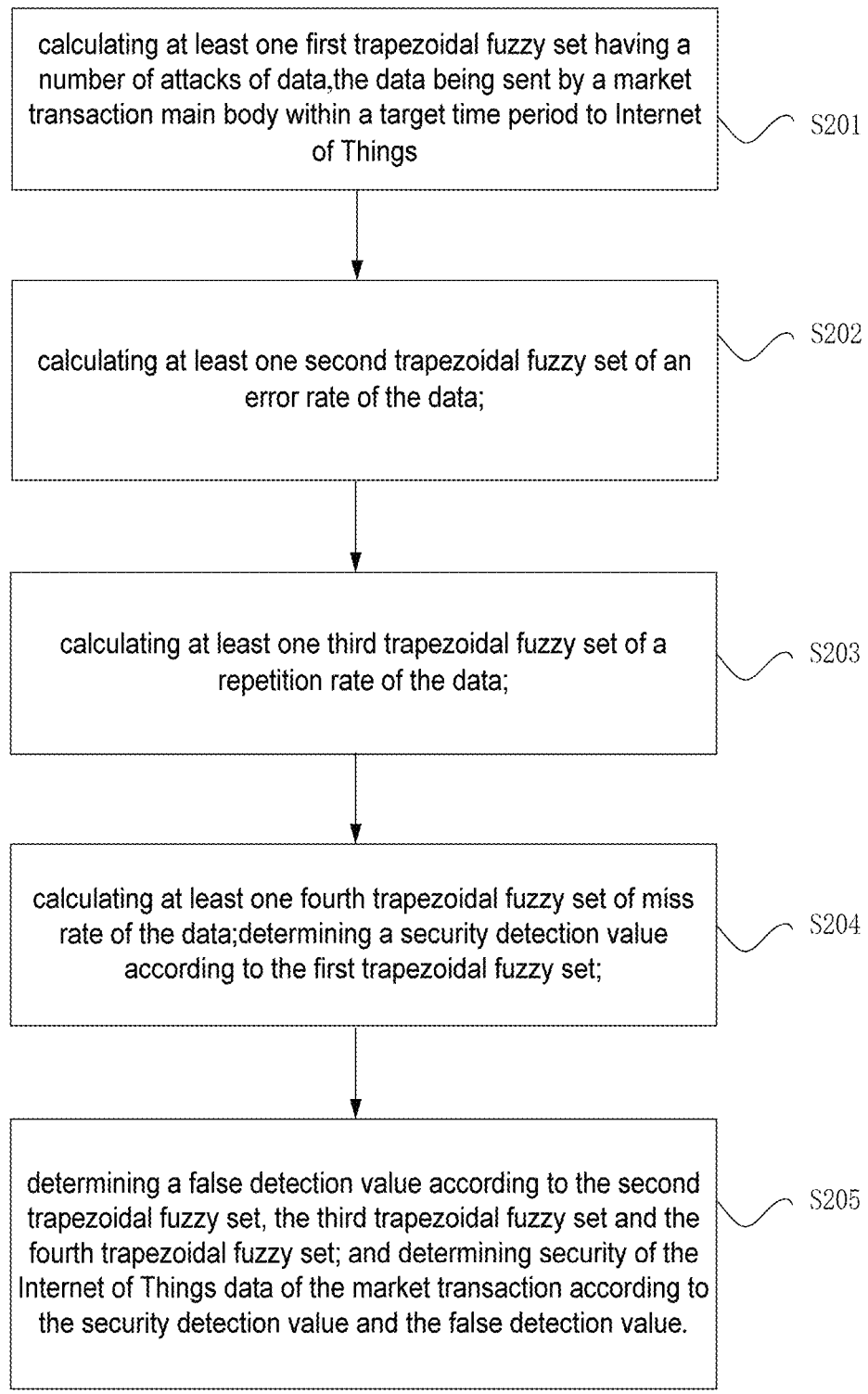
FIG. 2 shows a schematic flowchart of a method for detecting security of Internet of Things data of a market transaction according to an embodiment of the present application.

FIG. 2 is a flowchart of a method for detecting security of Internet of Things data of a market transaction according to an embodiment of the present application. As shown in FIG. 2, the method comprises the following steps:

Step S201, calculating at least one first trapezoidal fuzzy set having a number of attacks of data, the data being sent by a market transaction main body within a target time period to Internet of Things;

Specifically, first, the number of times that data sent by a market transaction main body to an Internet of Things has an attack is evaluated, and data information about the generated power and the quote thereof, the frequency modulation power and the quote thereof for bidding, the peak modulation power and the quote thereof for bidding, and the voltage modulation power and the quote thereof for bidding sent by the market transaction main body to the Internet of Things can be monitored on a network layer by using an Internet of Things perception system. Using a statistical analysis method to calculate a first trapezoidal fuzzy set having the number of attacks in data sent by a market transaction main body within a target time period to the Internet of Things.

Step S202, calculating at least one second trapezoidal fuzzy set of an error rate of the data; Specifically, the data error rate sent by the market transaction main body to the Internet of Things is evaluated, and data information about the generated power and the quotes thereof, the frequency modulation power and the quotes thereof for bidding, the peak modulation power and the quotes thereof for bidding, and the voltage modulation power and the quotes thereof for bidding sent by the market transaction main body to the Internet of Things can be monitored by using the Internet of Things perception system on the network layer as well. Using a statistical analysis method to calculate a second trapezoidal fuzzy setting of a data error rate sent by a market transaction main body within a target time period to Internet of Things.

Step S203, calculating at least one third trapezoidal fuzzy set of a repetition rate of the data;

Specifically, a data repetition rate sent by a market transaction main body to an Internet of things is evaluated; and data information about a generated power and a quote thereof, a frequency modulation power and a quote thereof for bidding, a peak modulation power and a quote thereof for bidding, and a voltage modulation power and a quote thereof for bidding sent by the market transaction main body to the Internet of things can be monitored on a network layer by using an Internet of things perception system. Using a statistical analysis method to calculate a third trapezoidal fuzzy setting of a repetition rate in the described data sent by the market transaction main body of the target time period to the described Internet of things.

Step S204, calculating at least one fourth trapezoidal fuzzy set of miss rate of the data; determining a security detection value according to the first trapezoidal fuzzy set;

Specifically, a data loss rate sent by a market transaction main body to an Internet of Things is evaluated; and data information about a generated power and a quote thereof, a frequency modulation power and a quote thereof for bidding, a peak modulation power and a quote thereof for bidding, and a voltage modulation power and a quote thereof for bidding sent by the market transaction main body to the Internet of Things can be monitored on a network layer by using an Internet of Things perception system. Using a statistical analysis method to calculate a fourth trapezoidal fuzzy setting of a deletion rate in the described data sent by the market transaction entity of the target time period to the described Internet of things.

Step S205: determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

Specifically, a security detection value is determined according to whether there is an attack, i.e., a first trapezoidal fuzzy set; a false detection value is determined according to whether there are errors, repetitions, and deletions, i.e., second, third and fourth trapezoidal fuzzy values; and finally, the security of market transaction data is determined according to the security detection value and the false detection value.

By means of the embodiment, a statistical analysis method is used to calculate a first trapezoid fuzzy set having the number of attacks, a second trapezoid fuzzy set having an error rate, a third trapezoid fuzzy set having a repetition rate and a fourth trapezoid fuzzy set having a deletion rate in data sent by a market transaction main body in a target time period to Internet of things; a security detection value is determined according to the first trapezoid fuzzy set; a false detection value is determined according to the second trapezoid fuzzy set, the third trapezoid fuzzy set and the fourth trapezoid fuzzy set; and the security of market transaction Internet of things data is determined according to the security detection value and the false detection value. In the prior art, there may be a security problem in market transaction data. In the present application, security detection is performed on market transaction Internet of Things data by calculating uncertain ambiguous sets, which can reflect the number of attacks on transmission data, a data error rate, a data repetition rate, a data deletion rate, etc., and accurately determine the security of market transaction Internet of Things data. Therefore, the problem of security of market transaction data in the prior art can be alleviated.

In a specific implementation process, the step S201 may be implemented by the following steps: the number of attacks of the nine first trapezoidal fuzzy set being extremely low, very low, low, lower, middle, higher, high, very high and extremely high, of the number of attacks of the data sent by the marketing transaction entity to the Internet of things within the described target time period as $N_{ADi}=(N_{ADi1}, N_{ADi2}, N_{ADi3}, N_{ADi4}; k_{DAi})$, wherein i=1, 2, . . . , 9, $N_{ADi}$ being the $i^{th}$ first trapezoidal fuzzy set having the number of attacks in the data sent by the market transaction main body to the Internet of things, $N_{ADi1}$ is the power generation power and offer data of the $i^{th}$ first trapezoidal fuzzy set, and $N_{ADi2}$ is the frequency modulation power and offer data of the $i^{th}$ first trapezoidal fuzzy set, $N_{ADi3}$ is peak modulation power and offer data of the $i^{th}$ first trapezoidal blur set, and $N_{ADi4}$ is regulated power and offer data in the $i^{th}$ first trapezoidal blur set, $k_{DAi}$ is a membership coefficient of the $i^{th}$ first-trapezoidal fuzzy set. In the method, a first trapezoidal fuzzy set is calculated by means of the described steps, so that the first trapezoidal fuzzy set can be accurately calculated.

Specifically, t=1, 2, . . . , $N_{RP}$ there are a plurality of target time periods t; the number of attacks in data sent to the Internet of Things by a marketing transaction agent in each target time period is counted; and nine blurred trapezoidal blurred sets, i.e. first trapezoidal blurred sets corresponding to extremely low, very low, low, low, medium, high, high, very high, and extremely high, are obtained respectively, which represent the number of attacks in the data.

In some optional implementations, in the above step S202, a second trapezoidal fuzzy set of error rates in the above data transmitted to the Internet of things by the market transaction subject in the above target time period is calculated using a statistical analysis method, The method can be realized by the following steps: using the described statistical analysis method to calculate the described second trapezoidal fuzzy set with a very low, very low, low, low, medium, high, high, very high and very high ambiguity of the error rate in the data sent by the marketing transaction entity to the Internet of things in the described target time period as $k_{ei}=(k_{ei1}, k_{ei2}; k_{ei3}, k_{ei4}; k_{eki})$, wherein i=1, 2, . . . , 9, $k_{ei}$ being the ith second trapezoidal fuzzy set of an error rate in the described data sent by the market transaction main body to the described Internet of Things, $k_{ei1}$ is the power generation power and offer data in said ith second trapezoidal fuzzy set, and $k_{ei2}$ is the frequency modulation power and offer data in said ith second trapezoidal fuzzy set, $k_{ei3}$ is peak modulation power and offer data in the ith second trapezoidal blur set, and $k_{ei4}$ is regulated power and offer data in the ith second trapezoidal blur set, k eki is a membership coefficient of the ith second trapezoidal blur set. In the method, a second trapezoid fuzzy set representing an error rate is obtained by means of calculation in the described steps, so that an error rate can be accurately analyzed.

In a specific implementation process, a target time period t is the same as the above, an error rate of data in each target time period is counted, and a fuzzy set of nine fuzzy uncertainties with an extremely low error rate, a very low error rate, a very low error rate, a very low error rate, a medium error rate, a very high error rate, a very high error rate, and an extremely high error rate is obtained, so as to represent the magnitude of the data error rate.

In order to accurately calculate and obtain a third trapezoidal fuzzy set, step S203 uses a statistical analysis method to calculate a third trapezoidal fuzzy set of a repetition rate in the data sent to the Internet of things by the market transaction main body within the target time period, The method can be realized by the following steps: using a statistical analysis method to calculate the third trapezoidal fuzzy set with extremely low, very low, low, low, medium, high, high, very high and extremely high ambiguity of the repetition rate in the data sent by the marketing transaction entity during the target time period to the Internet of things as $k_{Ri}=(k_{Ri1}, k_{Ri2}, k_{Ri3}, k_{Ri4}; k_{Rki})$, wherein i=1, 2, . . . , 9, $k_{Ri}$ being the ith third trapezoidal fuzzy set of the repetition rate in the described data sent by the market transaction main body to the described Internet of things, $k_{Ri1}$ is the power generation power and offer data in the ith said third trapezoidal fuzzy set, and $k_{Ri2}$ is the frequency modulation power and offer data in the ith said third trapezoidal fuzzy set, $k_{Ri3}$ is peak modulation power and offer data in the ith third trapezoids cloud set, $k_{Ri4}$ is the surge power and offer data in the ith third trapezoids cloud set, $k_{Rki}$ is a membership coefficient of the ith third-trapezoidal fuzzy set. In the method, an uncertain fuzzy set of repetition rates in transmitted data is calculated through the described steps, so that a third trapezoid fuzzy set can be accurately determined.

Specifically, the target time period is t. The repetition rate of the data in each target time period is counted, and nine fuzzy ambiguity ambiguous sets with extremely low, very low, low, low, medium, high, high, very high and extremely high repetition rates are obtained, so as to represent the size of the repetition rate in the data.

In some optional implementations, in the step S204, a fourth trapezoidal fuzzy set of miss rates in the data sent to the Internet of things by the marketing transaction entity during the target time period is calculated by using a statistical analysis method, The method can be realized by the following steps: using a statistical analysis method to calculate the fourth trapezoidal fuzzy set with the uncertainties of very low, very low, low, low, medium, high, high, very high and very high fuzziness of the missing rate in the data sent by the marketing transaction entity during the target time period to the Internet of things $k_{Li}=(k_{Li1}, k_{Li2}, k_{Li3}, k_{Li4}; k_{Lki})$, where i=1, 2, . . . , 9, $k_{Li1}$ is the power generation power and offer data of the ith fourth trapezoidal blur set, $k_{Li2}$ is the frequency modulation power and offer data in the ith fourth trapezoidal fuzzy set mentioned above, and $k_{Li3}$ is the peak modulation power and offer data in the ith fourth trapezoidal fuzzy set mentioned above, $k_{Li4}$ is the power and offer data in the ith fourth-trapezoidal fuzzy set, and $k_{Lki}$ is the membership coefficient of the ith fourth-trapezoidal fuzzy set. In the method, an uncertain ambiguity set of deletion rates is calculated through the above steps, so that the absence of data can be analyzed accurately.

In a specific implementation process, a target time period, such as t1, is counted as a missing condition, i.e., a missing rate, in data of each target time period, and a fuzzy set of nine fuzzy uncertainties, i.e., extremely low, very low, low, low, medium, high, high, very high, and extremely high, is generated, so as to represent a missing condition of the data.

In order to further quantify the security and the false nature of the data, the described step S205 determines security detection values according to the described first trapezoidal fuzzy set, and determining a false detection value according to the second trapezoidal fuzzy set, the third trapezoidal fuzzy set and the fourth trapezoidal fuzzy set, This can be achieved by determining the security measure from the first set of trapezoidal blur values by a formula $$k_A = \frac{N_{AD}}{N_{TD} + N_{AD}},$$

where $k_A$ denotes the security detection value and $k_A \geq 0$, $N_{TD}$ denotes the number of real data transmitted to the Internet of things by the marketing transaction entity, NAD stands for the first trapezium ambiguous set described above; determining a false detection fuzzy set by means of a formula $$N_{FD} = N_D \sum_{i=1}^{N_{RP}} \left( k'_{eC} k'_{eL} \sum_{i=1}^{9} E[k_{ei}] + k'_{RC} k'_{RL} \sum_{i=1}^{9} E[k_{Ri}] + k'_{LC} k'_{LL} \sum_{i=1}^{9} E[k_{Li}] \right),$$

and determining the false detection value according to the formula $$k_F = \frac{N_{FD}}{N_{TD} + N_{FD}}$$

by means of the false detection fuzzy set, wherein $N_{FD}$ represents the false detection fuzzy set, $N_D$ represents the amount of data sent by the market transaction entity to the Internet of Things, $k_{eC}^t$ is a first membership factor of the second ladder fuzzy set, and $k_{eL}^t$ is a second membership factor of the second ladder fuzzy set, $E(k_{ei})$ is the mathematical expectation of the second ladder fuzzy set, $k_{RC}^t$ is the first membership coefficient of the third ladder fuzzy set, $k_{RL}^t$ is the second membership coefficient being the third set of trapezoidal ambiguous sets and $E(k_{Ri})$ being the mathematical expectation of the third set of trapezoidal ambiguous sets, $k_{LC}^t$ is a first membership factor of the fourth set of trapezoidal ambiguous sets and $k_{LL}^t$ is a second membership factor of the fourth set of trapezoidal ambiguous sets $E(k_{Li})$, t is the t-th target time period and t=1, 2, . . . , $N_{RP}$, $k_F$ indicates the false detection value and $k_F \geq 0$, $N_{FD}$ indicates the number of false data sent to the Internet of things by the market trading entity.

Specifically, in the platform layer, the marketing business subject sends data to the Internet of Things, and if there is a situation such as a momentary attack, this indicates that the sent data greatly affects the security of the Internet of Things. The security of the data sent by the marketing business subject to the Internet of Things is evaluated according to the following criteria:

$$k_A = \frac{N_{AD}}{N_{TD} + N_{AD}}$$

In the platform layer, the marketing business subject sends data to the Internet of Things, and if there are errors, duplicate, or missing, this indicates that the sent data is spurious. The spuriousness of the data sent by the market transaction entity to the Internet of Things is evaluated according to the following index $$k_F = \frac{N_{FD}}{N_{TD} + N_{FD}},$$

in which the number $N_{FD}$ of the spuriousness data in the data sent by the market transaction entity to the Internet of Things is represented by the following formula $$N_{FD} = N_D \sum_{i=1}^{N_{RP}} \left( k'_{eC} k'_{eL} \sum_{i=1}^{9} E[k_{ei}] + k'_{RC} k'_{RL} \sum_{i=1}^{9} E[k_{Ri}] + k'_{LC} k'_{LL} \sum_{i=1}^{9} E[k_{Li}] \right).$$

In some optional implementations, the step S205 of determining, according to the security detection value and the false detection value, the security of Internet of Things data of a market transaction may be implemented by the following steps: in a case in which both the security detection value and the false detection value are 0, determining that the Internet of Things data of the market transaction is secure; in the case where the security detection value is greater than 0 and the false detection value is 0, determining that data attack exists in the market transaction Internet of Things data and false data does not exist; and in a case that the security detection value is 0 and the false detection value is greater than 0, determining that no data attack exists in the market transaction Internet of Things data and false data exists in the market transaction Internet of Things data. According to the method, a security or false problem existing in market transaction Internet of Things data is determined according to a security detection value and a false detection value obtained by means of calculation, so that a problem existing in data can be accurately determined.

In a specific implementation process, a data security detection criterion for the market transaction Internet of Things sending data can be obtained by using the calculated data loss value sent by the Internet of Things of the market transaction and the vacationality and security evaluation index for the market transaction master sending data to the Internet of Things; and when $k_F=0$ and $k_A=0$ exist, there is no problem in data security. When $k_F=0$, $k_A>0$, there is no false data, but there is a data attack problem. When $k_F>0$, $k_A=0$, there is false data, but no data attack. The above criteria may also be subdivided: Data Security Level 1 alerts, on $0<k_F\leq0.1$ or $0<k_A\leq0.1$ at the time. Data Security Level 2 alerts, when $0.2<k_F\leq0.3$ or $0.2<k_A\leq0.3$ Data security Level 3 alerts, when $0.3<k_F\leq0.4$ or $0.3<k_A\leq0.4$ Data security level 4 alerts, when $0.4<k_F\leq0.5$ or $0.4<k_A\leq0.5$. Data security level 5 alerts, when $0.5<k_F\leq0.6$ or $0.5<k_A\leq0.6$. Data security level 6 alerts, when $0.6<k_F\leq0.7$ or $0.6<k_A\leq0.7$. Data security level 7 alerts, when $0.7<k_F\leq0.8$ or $0.7<k_A\leq0.8$ Data security level 8 alerts, when $0.8<k_F\leq0.9$ or $0.8<k_A\leq0.9$. Data security level 9 alerts, when $0.9<k_F\leq1.0$ or $0.9<k_A\leq1.0$.

In some optional embodiments, the method further comprises calculating a channel blocking rate of data sent by the market transaction entity to the Internet of Things. In a network layer, by means of an Internet of Things perception system, data information about a generated power and an offer thereof, a frequency modulation power and an offer thereof for bidding, a peak modulation power and an offer thereof for bidding, and a voltage modulation power and an offer thereof for bidding sent by a market trading entity to the Internet of Things can be monitored. The statistical analysis method is used to calculate a trapezoidal fuzzy set $k_{Zi}$ (i=1, 2, ..., 9), $k_{Zi}=(k_{Zi1}, k_{Zi2}, k_{Zi3}, k_{Zi4}; k_{Zki})$ of nine fuzzy uncertainties, i. e. very low, very low, low, low, medium, high, high, very high and very high, of a block rate of a data channel sent by a market transaction main body during the described target time period t (t=1, 2, ..., $N_{RP}$) to Internet of Things, where $k_{Zi}$ is the i-th trapezoidal fuzzy set of the blocking rate of the channel where market trading entities send data to the Internet of Things, and $k_{Zi1}$, $k_{Zi2}$, $k_{Zi3}$ are the fuzzy set $k_{Zi4}$ and $k_{Zki}$ membership coefficients of the i-th trapezoidal fuzzy set of the blocking rate of the channel where market trading entities send data to the Internet of Things, respectively.

In order to enable those skilled in the art to understand the technical solutions of the present application more clearly, the implementation process of the method for detecting the security of the market transaction Internet of Things data of the present application will be described in detail below in conjunction with specific embodiments.

Figure 3:
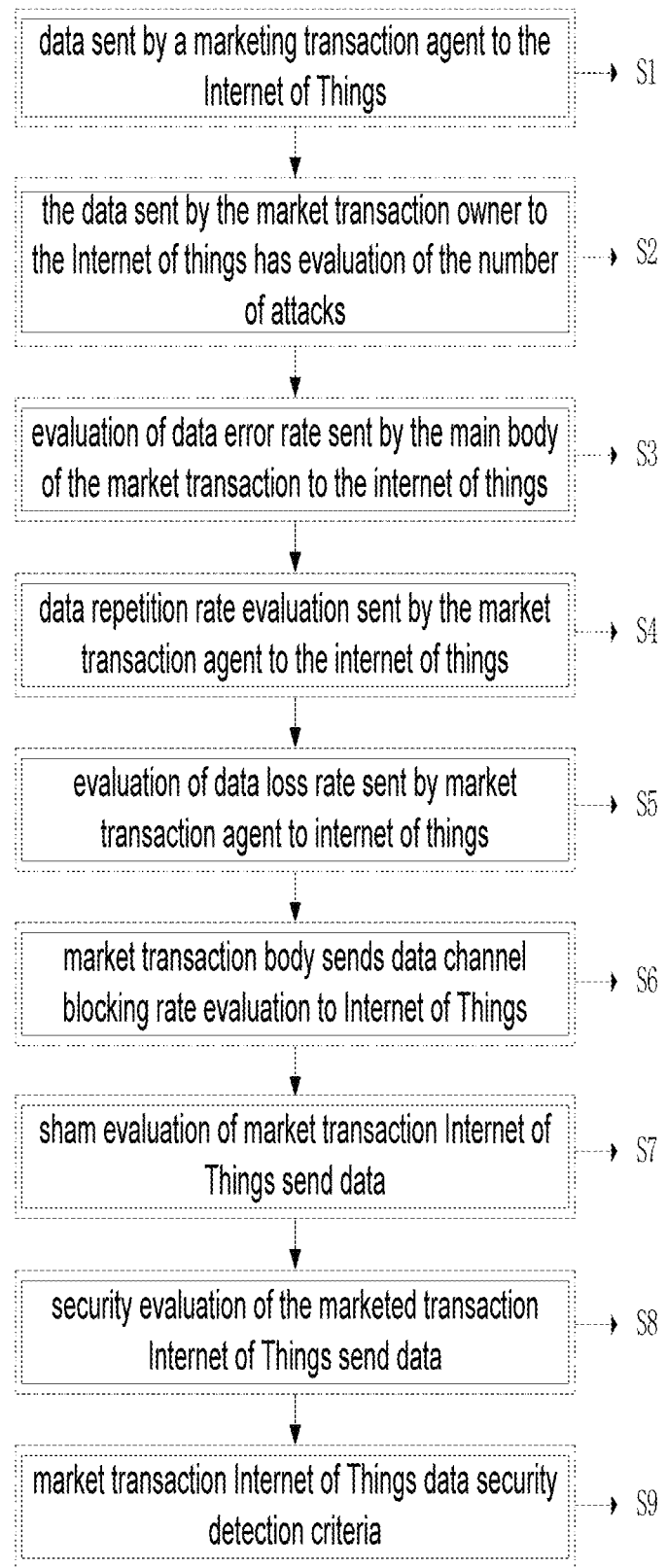
FIG. 3 illustrates a schematic flowchart of a method for detecting security of Internet of Things data of a market transaction according to an embodiment of the present disclosure.

The present embodiment relates to a specific security detection method for Internet of Things data of market transactions. As shown in FIG. 3, the method comprises the following steps:

Step S1: data sent by a market transaction owner to an Internet of Things;

Step S2: the data sent by the market transaction owner to the Internet of Things has an evaluation of the number of attacks;

Step S3: evaluating the data error rate sent by the market transaction owner to the Internet of Things;

Step S4: evaluating a data repetition rate sent by a market transaction owner to the Internet of Things;

Step S5: evaluating a data loss rate sent by the market transaction owner to the Internet of Things;

Step S6: evaluating a data channel blocking rate sent by the market transaction owner to the Internet of Things;

Step S7: a vacation evaluation of data sent by the market transaction entity to the Internet of Things;

Step S8: the market transaction owner sends a security evaluation of the data to the Internet of Things;

Step S9: a market transaction Internet of Things data security detection criterion.

An embodiment of the present application also provides a security detection device for Internet of Things data of a market transaction. It should be noted that the security detection device for Internet of Things data of a market transaction of the embodiment of the present application can be used for executing the security detection method for Internet of Things data of a market transaction provided by the embodiment of the present application. The device is configured to implement the described embodiment and example implementation mode, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

The following introduces a security detection device for Internet of Things data of a market transaction provided by an embodiment of the present application.

Figure 4:
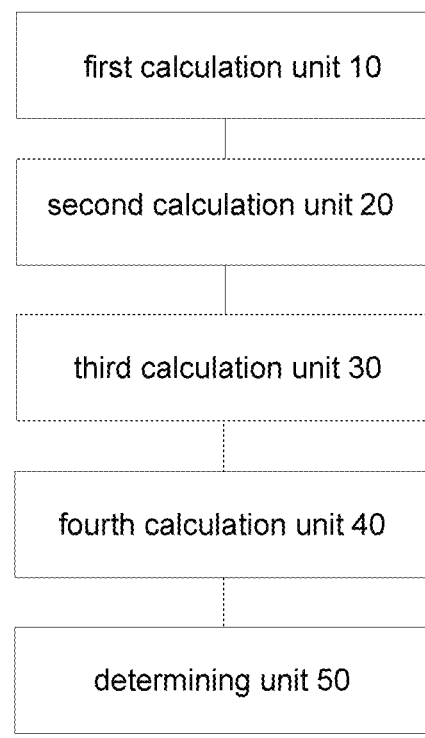
FIG. 4 shows a structural block diagram of a device for detecting security of Internet of Things data of a market transaction according to an embodiment of the present application.

FIG. 4 is a schematic diagram of a device for detecting security of Internet of Things data of a market transaction according to an embodiment of the present application. As shown in FIG. 4, the device comprises:

A first calculation unit 10 for calculating, by using a statistical analysis method, a first trapezoidal fuzzy set having the number of attacks in data sent by a market transaction main body of a target time period to the Internet of things;

Specifically, first, the number of times that data sent by a market transaction main body to an Internet of Things has an attack is evaluated, and data information about the generated power and the quote thereof, the frequency modulation power and the quote thereof for bidding, the peak modulation power and the quote thereof for bidding, and the voltage modulation power and the quote thereof for bidding sent by the market transaction main body to the Internet of Things can be monitored on a network layer by using an Internet of Things perception system. Using a statistical analysis method to calculate a first trapezoidal fuzzy set having the number of attacks in data sent by a market transaction main body within a target time period to the Internet of Things.

A second calculation unit 20 for calculating a second trapezoidal fuzzy set of an error rate in the data sent to the Internet of things by the market transaction main body within the target time period using a statistical analysis method;

Specifically, the data error rate sent by the market transaction main body to the Internet of Things is evaluated, and data information about the generated power and the quotes thereof, the frequency modulation power and the quotes thereof for bidding, the peak modulation power and the quotes thereof for bidding, and the voltage modulation power and the quotes thereof for bidding sent by the market transaction main body to the Internet of Things can be monitored by using the Internet of Things perception system on the network layer as well. Using a statistical analysis method to calculate a second trapezoidal fuzzy setting of a data error rate sent by a market transaction main body within a target time period to Internet of Things.

A third calculation unit 30 for calculating a third trapezoidal fuzzy set of a repetition rate in the data sent to the Internet of things by the market transaction main body during the target time period using a statistical analysis method;

Specifically, a data repetition rate sent by a market transaction main body to an Internet of things is evaluated; and data information about a generated power and a quote thereof, a frequency modulation power and a quote thereof for bidding, a peak modulation power and a quote thereof for bidding, and a voltage modulation power and a quote thereof for bidding sent by the market transaction main body to the Internet of things can be monitored on a network layer by using an Internet of things perception system. Using a statistical analysis method to calculate a third trapezoidal fuzzy set of a repetition rate in the described data sent by the market transaction main body of the target time period to the described Internet of things.

A fourth calculation unit 40 for calculating, by using a statistical analysis method, a fourth trapezoidal fuzzy set of miss rate in the data sent to the Internet of things by the market transaction body within the target time period;

Specifically, a data loss rate sent by a market transaction main body to an Internet of Things is evaluated; and data information about a generated power and a quote thereof, a frequency modulation power and a quote thereof for bidding, a peak modulation power and a quote thereof for bidding, and a voltage modulation power and a quote thereof for bidding sent by the market transaction main body to the Internet of Things can be monitored on a network layer by using an Internet of Things perception system. Using a statistical analysis method to calculate a fourth trapezoidal fuzzy set of a deletion rate in the described data sent by the market transaction entity of the target time period to the described Internet of things.

A determination unit 50 for determining a security detection value according to the first trapezoidal fuzzy set, determining a false detection value according to the second trapezoidal fuzzy set, the third trapezoidal fuzzy set and the fourth trapezoidal fuzzy set, and determining the security of Internet of Things data of a market transaction according to the security detection value and the false detection value.

Specifically, a security detection value is determined according to whether there is an attack, i.e., a first trapezoidal fuzzy set; a false detection value is determined according to whether there are errors, repetitions, and deletions, i.e., second, third and fourth trapezoidal fuzzy values; and finally, the security of market transaction data is determined according to the security detection value and the false detection value.

By means of the embodiment, a statistical analysis method is used to calculate a first trapezoid fuzzy set having the number of attacks, a second trapezoid fuzzy set having an error rate, a third trapezoid fuzzy set having a repetition rate and a fourth trapezoid fuzzy set having a deletion rate in data sent by a market transaction main body in a target time period to Internet of things; a security detection value is determined according to the first trapezoid fuzzy set; a false detection value is determined according to the second trapezoid fuzzy set, the third trapezoid fuzzy set and the fourth trapezoid fuzzy set; and the security of market transaction Internet of things data is determined according to the security detection value and the false detection value. In the prior art, there may be a security problem in market transaction data. In the present application, security detection is performed on market transaction Internet of Things data by calculating uncertain ambiguous sets, which can reflect the number of attacks on transmission data, a data error rate, a data repetition rate, a data deletion rate, etc., and accurately determine the security of market transaction Internet of Things data. Therefore, the problem of security of market transaction data in the prior art can be alleviated.

In a specific implementation process, the first calculation unit comprises a first calculation module used for calculating, by using the described statistical analysis method, a first trapezoidal fuzzy set $N_{ADi}=(N_{ADi1}, N_{ADi2}, N_{ADi3}, N_{ADi4}; k_{DAi})$ having nine fuzzy uncertainties, the number of attacks being very low, very low, low, relatively low, medium, relatively high, high, very high and very high, in the data sent by the marketing transaction entity to the Internet of things in the described target time period, wherein i=1, 2, . . . , 9, $N_{ADi}$ is the $i^{th}$ first trapezoidal fuzzy set of the number of attacks in the data sent by the market transaction main body to the Internet of Things, $N_{ADi1}$ is the power generation power and offer data of the $i^{th}$ first trapezoidal fuzzy set, and $N_{ADi2}$ is the frequency modulation power and offer data of the $i^{th}$ first trapezoidal fuzzy set, $N_{ADi3}$ is the peak tuning power and offer data of the $i^{th}$ first trapezoidal fuzzy set, and $N_{ADi4}$ is the peak tuning power and offer data of the $i^{th}$ first trapezoidal fuzzy set, $k_{DAi}$ is a membership coefficient of the $i^{th}$ first-trapezoidal fuzzy set. In the method, a first trapezoidal fuzzy set is calculated by means of the described steps, so that the first trapezoidal fuzzy set can be accurately calculated.

Specifically, t=1, 2, . . . , $N_{RP}$ there are a plurality of target time periods t; the number of attacks in data sent to the Internet of Things by a marketing transaction agent in each target time period is counted; and nine blurred trapezoidal blurred sets, i.e. first trapezoidal blurred sets corresponding to extremely low, very low, low, low, medium, high, high, very high, and extremely high, are obtained respectively, which represent the number of attacks in the data.

In some optional implementations, the second calculation unit comprises a second calculation module configured to calculate, by using the statistical analysis method, a second trapezoidal fuzzy set $k_{ei}=(k_{ei1}, k_{ei2}, k_{ei3}, k_{ei4}; k_{eki})$ with a minimum, very low, low, low, medium, high, high, very high ambiguity in the data sent to the Internet of things by the marketing transaction subject within the target time period, wherein i=1, 2, . . . , 9, $k_{ei}$ is the ith second trapezoidal fuzzy set of an error rate in the described data sent by the market transaction main body to the described Internet of Things, $k_{ei1}$ is the power generation power and offer data of the ith second trapezoidal blur set, and $k_{ei2}$ is the frequency modulation power and offer data of the ith second trapezoidal blur set, $k_{ei3}$ is the peak modulation power and offer data in the ith second trapezoidal blur set, and $k_{eki}$ is the peak modulation power and offer data in the ith second trapezoidal blur set, $k_{eki}$ is a membership coefficient of the ith second-trapezoidal fuzzy set. In the method, a second trapezoid fuzzy set representing an error rate is obtained by means of calculation in the described steps, so that an error rate can be accurately analyzed.

In a specific implementation process, a target time period t is the same as the above, an error rate of data in each target time period is counted, and a fuzzy set of nine fuzzy uncertainties with an extremely low error rate, a very low error rate, a very low error rate, a very low error rate, a medium error rate, a very high error rate, a very high error rate, and an extremely high error rate is obtained, so as to represent the magnitude of the data error rate.

In order to accurately calculate and obtain a third trapezoidal fuzzy set, the described third calculation unit comprises a third calculation module, the third trapezoidal fuzzy set $k_{Ri}=(k_{Ri1}, k_{Ri2}, k_{Ri3}, k_{Ri4}; k_{Rki})$ for calculating nine ambiguous uncertainties of extremely low, very low, low, low, middle, high, high, very high and extremely high repetition rates of the data sent by the marketing transaction entity during the target time period to the Internet of things by using a statistical analysis method, wherein i=1, 2, ..., 9, $k_{Ri}$ is the ith third trapezoidal fuzzy set of the repetition rate in the described data sent by the market transaction main body to the described Internet of things, $k_{Ri1}$ is the power generation power and offer data of the ith said third trapezoidal blur set, $k_{Ri2}$ is the frequency modulation power and offer data of the ith said third trapezoidal blur set, $k_{Ri3}$ is the peak modulation power and offer data in the ith above-mentioned third trapezoidal fuzzy set, and $k_{Ri4}$ is the peak modulation power and offer data in the ith above-mentioned third trapezoidal fuzzy set, $k_{Rki}$ is a membership coefficient of the ith foregoing third trapezoidal blur set. In the method, an uncertain fuzzy set of repetition rates in transmitted data is calculated through the described steps, so that a third trapezoid fuzzy set can be accurately determined.

Specifically, the target time period is t. The repetition rate of the data in each target time period is counted, and nine fuzzy ambiguity ambiguous sets with extremely low, very low, low, low, low, medium, high, high, very high and extremely high repetition rates are obtained, so as to represent the size of the repetition rate in the data.

In some optional implementations, the fourth calculation unit comprises a fourth calculation module configured to calculate, by using a statistical analysis method, a fourth trapezoidal ambiguity set $k_{Li}=(k_{Li1}, k_{Li2}, k_{Li3}, k_{Li4}; k_{Lki})$ having nine ambiguity values, that is, an extremely low ambiguity, a very low ambiguity, a very low ambiguity, a very low ambiguity, a very low ambiguity, a middle ambiguity, a relatively high ambiguity, a very high ambiguity, and a very high ambiguity in the data sent by the marketing transaction entity within the target time period to the Internet of things, where i=1, 2, ..., 9, $k_{Li1}$ is the power generation power and offer data of the ith fourth trapezoidal blur set, $k_{Li2}$ is the frequency modulation power and offer data in the ith fourth trapezoidal blur set, and $k_{Li3}$ is the peak modulation power and offer data in the ith fourth trapezoidal blur set, $k_{Li4}$ is the regulated power and offer data in the ith fourth-trapezoidal fuzzy set, and $k_{Lki}$ is the membership coefficient of the ith fourth-trapezoidal fuzzy set. In the method, an uncertain ambiguity set of deletion rates is calculated through the above steps, so that the absence of data can be analyzed accurately.

In a specific implementation process, a target time period, such as t1, is counted as a missing condition, i.e., a missing rate, in data of each target time period, and a fuzzy set of nine fuzzy uncertainties, i.e., extremely low, very low, low, low, medium, high, high, very high, and extremely high, is generated, so as to represent a missing condition of the data.

In order to further quantify the security and the false nature of the data, the described determination unit comprises a first determination module and a second determination module, a first determination module is used for determining a security detection value according to the described first trapezoidal fuzzy set via a formula $$k_A = \frac{N_{AD}}{N_{ID} + N_{AD}},$$

where $k_A$ denotes the security detection value and $k_A \geq 0$, $N_{TD}$ denotes the number of real data transmitted to the Internet of things by the marketing transaction entity, $N_{AD}$ stands for the first trapezium ambiguous set described above; the second determination module is used for determining a false detection fuzzy set a formula via $$N_{FD} = N_D \sum_{i=1}^{N_{RP}} \left( k_{eC}^t k_{LL}^t \sum_{i=1}^{9} E[k_{ei}] + k_{RC}^t k_{RL}^t \sum_{i=1}^{9} E[k_{Ri}] + k_{LC}^t k_{LL}^t \sum_{i=1}^{9} E[k_{L,i}] \right),$$

and determining the false detection value via the false detection fuzzy set according to the formula $$k_F = \frac{N_{FD}}{N_{TD} + N_{FD}},$$

wherein $N_{FD}$ represents the false detection fuzzy set, $N_D$ represents the amount of data sent by the market transaction entity to the Internet of Things, $k_{eC}^t$ is a first membership factor of the second ladder fuzzy set, and a second membership factor of the second ladder fuzzy set, $k_{eL}^t$ is the mathematical expectation of the second ladder fuzzy set, $E(k_{ei})$ is the first membership coefficient of the third ladder fuzzy set, $k_{RC}^t$ is the second membership coefficient $k_{RL}^t$ being the third set of trapezoidal ambiguous sets and $E(k_{Ri})$ being the mathematical expectation of the third set of trapezoidal ambiguous sets, $k_{LC}^t$ is a first membership factor of the fourth set of trapezoidal ambiguous sets and $k_{LL}^t$ is a second membership factor of the fourth set of trapezoidal ambiguous sets $E(k_{Li})$, t is the t-th target time period and t=1, 2, ..., $N_{RP}$, $K_F$ indicates the false detection value and $K_F > 0$, $N_{FD}$ indicates the number of false data sent to the Internet of things by the market trading entity.

Specifically, in the platform layer, the marketing business subject sends data to the Internet of Things, and if there is a situation such as a momentary attack, this indicates that the sent data greatly affects the security of the Internet of Things. The security of the data sent by the marketing business subject to the Internet of Things is evaluated according to the following criteria $$k_A = \frac{N_{AD}}{N_{ID} + N_{AD}};$$

in the platform layer, the marketing business subject sends data to the Internet of Things, and if there are errors, duplicate, or missing, this indicates that the sent data is spurious. The spuriousness of the data sent by the market transaction entity to the Internet of Things is evaluated according to the following indexes $$k_F = \frac{N_{FD}}{N_{TD} + N_{FD}},$$

wherein the amount $N_{FD}$ of the false data in the data sent by the market transaction entity to the Internet of Things is represented by the following formula $$N_{FD} = N_D \sum_{i=1}^{N_{RP}} \left( k_{eC}^t k_{LL}^t \sum_{i=1}^{9} E[k_{ei}] + k_{RC}^t k_{RL}^t \sum_{i=1}^{9} E[k_{Ri}] + k_{LC}^t k_{LL}^t \sum_{i=1}^{9} E[k_{L,i}] \right).$$

In some optional implementations, the determination unit further comprises a third determination module, a fourth determination module and a fifth determination module, wherein the third determination module is used for determining that the market transaction Internet of Things data is secure when both the security detection value and the false detection value are 0; a fourth determination module for determining that there is a data attack on the market transaction Internet of Things data and there is no false data in the case where the security detection value is greater than 0 and the false detection value is 0; the fifth determination module is configured to, when the security detection value is 0 and the false detection value is greater than 0, determine that no data attack exists in the market transaction Internet of Things data and false data exists in the market transaction Internet of Things data. According to the method, a security or false problem existing in market transaction Internet of Things data is determined according to a security detection value and a false detection value obtained by means of calculation, so that a problem existing in data can be accurately determined.

In a specific implementation process, a data security detection criterion for the market transaction Internet of Things sending data can be obtained by using the calculated data loss value sent by the Internet of Things of the market transaction and the vacationality and security evaluation index for the market transaction body sending data to the Internet of Things. When $k_F=0$ $k_A=0$, the data security is correct, there is no problem in the data security. When $k_F=0$, $k_A>0$, there is no false data, but there is a data attack problem. When $k_F>0$ $k_A=0$, there is false data, but no data attack. The above criteria may also be subdivided: Data Security Level 1 alerts, on $0<k_F\leq 0.1$ or $0<k_A\leq 0.1$ at the time. Data Security Level 2 alerts, when $0.2<k_F\leq 0.3$ or $0.2<k_A\leq 0.3$. Data security Level 3 alerts, when $0.3<k_F\leq 0.4$ or $0.3<k_A\leq 0.4$. Data security level 4 alerts, when $0.4<k_F\leq 0.5$ or $0.4<k_A\leq 0.5$. Data security level 5 alerts, when $0.5<k_F\leq 0.6$ or $0.5<k_A\leq 0.6$. Data security level 6 alerts, when $0.6<k_F\leq 0.7$ or $0.6<k_A\leq 0.7$, data security level 7 alerts, when $0.7<k_F\leq 0.8$ or $0.7<k_A\leq 0.8$, data security level 8 alerts, when or $0.8<k_F\leq 0.9$ or $0.8<k_A\leq 0.9$ Data security level 9 alerts, when $0.9<k_F\leq 1.0$ or $0.9<k_A\leq 1.0$.

In some optional embodiments, the method further comprises calculating a channel blocking rate of data sent by the market transaction entity to the Internet of Things. In a network layer, by means of an Internet of Things perception system, data information about a generated power and an offer thereof, a frequency modulation power and an offer thereof for bidding, a peak modulation power and an offer thereof for bidding, and a voltage modulation power and an offer thereof for bidding sent by a market trading entity to the Internet of Things can be monitored. using a statistical analysis method to calculate a trapezoidal fuzzy set $k_{Zi}$ (i=1, 2, ..., 9) $k_{Zi}=(k_{Zi1}, k_{Zi2}, k_{Zi3}, k_{Zi4}; k_{Zki})$ of nine fuzzy uncertainties, i.e. very low, very low, low, low, medium, high, high, very high and very high, of a block rate of a data channel sent by a market transaction entity of the described target time period t (t=1, 2, ..., $N_{RP}$) to Internet of Things, $k_{Zi}$, wherein an ith trapezoidal fuzzy set of a data channel blocking rate is sent to Internet of Things for a market transaction subject, $k_{Zi1}$, $k_{Zi2}$, $k_{Zi3}$, $k_{Zi4}$ and $k_{Zki}$ respectively are a fuzzy set and a membership coefficient of an ith trapezoidal fuzzy set of a data channel blocking rate, which are sent by a market transaction main body to the Internet of things.

The above-mentioned security detection device for market transaction Internet of Things data comprises a processor and a memory; the described first calculation unit, second calculation unit, third calculation unit, fourth calculation unit and determination unit, etc. are all stored in the memory as program units; and the processor executes the described program units stored in the memory to realize corresponding functions. All the described modules are located in the same processor; alternatively, the modules are located in different processors in an arbitrary combination.

The processor includes a kernel, and the kernel calls a corresponding program unit from a memory. One or more cores can be provided, and the security of market transaction data can be improved by adjusting the parameters of the cores.

The memory may include a non-permanent memory in a computer readable medium, a random access memory (RAM), and/or a non-volatile memory, such as a read-only memory (ROM) or a flash RAM, and the memory includes at least one memory chip.

Embodiments of the present invention provide a computer readable storage medium. The computer readable storage medium comprises a stored program. The program, when running, controls a device where the computer readable storage medium is located to execute the method for detecting security of market transaction Internet of Things data.

Specifically, the method for detecting the security of market transaction Internet of Things data comprises:

Step S201, calculating at least one first trapezoidal fuzzy set having a number of attacks of data, the data being sent by a market transaction main body within a target time period to Internet of Things;

Step S202, calculating at least one second trapezoidal fuzzy set of an error rate of the data; Specifically, the data error rate sent by the market transaction main body to the Internet of Things is evaluated, and data information about the generated power and the quotes thereof, the frequency modulation power and the quotes thereof for bidding, the peak modulation power and the quotes thereof for bidding, and the voltage modulation power and the quotes thereof for bidding sent by the market transaction main body to the Internet of Things can be monitored by using the Internet of Things perception system on the network layer as well. Using a statistical analysis method to calculate a second trapezoidal fuzzy setting of a error rate sent by a market transaction main body within a target time period to Internet of Things.

Step S203, calculating at least one third trapezoidal fuzzy set of a repetition rate of the data;

Step S204, calculating at least one fourth trapezoidal fuzzy set of miss rate of the data; determining a security detection value according to the first trapezoidal fuzzy set;

Step S205: determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

Provided is an electronic apparatus, comprising a processor, a memory and a program stored in the memory and capable of running on the processor, wherein when the processor executes the program, at least the following steps are achieved:

Step S201, calculating at least one first trapezoidal fuzzy set having a number of attacks of data, the data being sent by a market transaction main body within a target time period to Internet of Things;

Step S202, calculating at least one second trapezoidal fuzzy set of an error rate of the data; Specifically, the data error rate sent by the market transaction main body to the Internet of Things is evaluated, and data information about the generated power and the quotes thereof, the frequency modulation power and the quotes thereof for bidding, the peak modulation power and the quotes thereof for bidding, and the voltage modulation power and the quotes thereof for bidding sent by the market transaction main body to the Internet of Things can be monitored by using the Internet of Things perception system on the network layer as well. Using a statistical analysis method to calculate a second trapezoidal fuzzy setting of a data error rate sent by a market transaction main body within a target time period to Internet of Things.

Step S203, calculating at least one third trapezoidal fuzzy set of a repetition rate of the data;

Step S204, calculating at least one fourth trapezoidal fuzzy set of miss rate of the data; determining a security detection value according to the first trapezoidal fuzzy set;

Step S205: determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

The device herein may be a server, a PC, a PAD, a mobile phone, etc.

Optionally, a first trapezoidal fuzzy set $N_{ADi}=(N_{ADi1}, N_{ADi2}, N_{ADi3}, N_{ADi4}; k_{DAi})$ with nine ambiguous uncertainties of very low, very low, low, low, medium, high, high, very high and very high ambiguous uncertainties in the data sent by the marketing transaction entity to the Internet of things within the target time period is calculated by using the statistical analysis method, wherein i=1, 2, . . . , 9, $N_{ADi}$ is the $i^{th}$ first trapezoidal fuzzy set having the number of attacks in the data sent by the market transaction main body to the Internet of Things, NADA is the power generation power and offer data in the $i^{th}$ first trapezoidal fuzzy set, $N_{ADi2}$ is the frequency modulation power and offer data in the $i^{th}$ first trapezoidal fuzzy set, $N_{ADi3}$ is the peak tuning power and offer data of the $i^{th}$ first trapezoidal fuzzy set, and $N_{ADi4}$ is the peak tuning power and offer data of the $i^{th}$ first trapezoidal fuzzy set, $k_{DAi}$ is a membership coefficient of the $i^{th}$ first trapezoidal blur set.

Optionally, a statistical analysis method is used to calculate a second trapezoidal fuzzy set of an error rate in the data sent to the Internet of things by the marketing transaction subject in the target time period, comprising: using the statistical analysis method to calculate the second trapezoidal fuzzy set with a very low, very low, low, low, medium, high, high, very high and very high ambiguity in the data sent by the marketing transaction entity to the Internet of things in the target time period as $k_{ei}=(k_{ei1}, k_{ei2}, k_{ei3}, k_{ei4}; k_{eki})$, wherein i=1, 2, . . . , 9, $k_{ei}$ is the ith second trapezoidal fuzzy set of error rates in the data sent by the market transaction agent to the Internet of Things, $k_{ei1}$ is the power generation power and offer data in the ith second trapezoidal fuzzy set, and $k_{ei2}$ is the frequency modulation power and offer data in the ith second trapezoidal fuzzy set, $k_{ei3}$ is the peak tuning power and offer data of the ith second trapezoidal fuzzy set, and $k_{ei4}$ is the peak tuning power and offer data of the ith second trapezoidal fuzzy set, $k_{eki}$ is a membership coefficient of the ith second trapezoidal blur set.

Optionally, a statistical analysis method is used to calculate a third trapezoidal fuzzy set of a repetition rate in the data sent to the Internet of things by the market trading entity during the target time period, comprising: using a statistical analysis method to calculate the third trapezoidal fuzzy set $k_{Ri}=(k_{Ri1}, k_{Ri2}, k_{Ri3}, k_{Ri4}; k_{Rki})$ with extremely low, very low, low, low, medium, high, high, very high and extremely high ambiguity of the repetition rate of the data sent by the marketing transaction entity in the target time period to the Internet of things, wherein i=1, 2, . . . , 9, $k_{Ri}$ is the ith third trapezoidal fuzzy set of the repetition rate in the data sent by the market transaction agent to the Internet of Things, $k_{Ri1}$ is the power generation power and offer data of the ith said third trapezoidal fuzzy set, and $k_{Ri2}$ is the frequency modulation power and offer data of the ith said third trapezoidal fuzzy set, $k_{Ri3}$ is modus power and offer data in the ith third trapezoidal blur set, and $k_{Ri4}$ is the power and offer data in the ith third trapezoidal blur set, $k_{Rki}$ is a membership coefficient of the ith third-trapezoidal fuzzy set.

Optionally, a statistical analysis method is used to calculate a fourth trapezoidal fuzzy set of miss rates in the data sent to the Internet of Things by the marketing transaction entity during the target time period, comprising: using a statistical analysis method to calculate the fourth trapezoidal fuzzy set $k_{Li}=(k_{Li1}, k_{Li2}, k_{Li3}, k_{Li4}; k_{Lki})$ with nine fuzzy uncertainties, i.e. a very low ambiguity, a very low ambiguity, a low ambiguity, a very low ambiguity, a medium ambiguity, a relatively high ambiguity, a very high ambiguity and a very high ambiguity in the data sent by the marketing transaction entity in the target time period to the Internet of things, wherein i=1, 2, . . . , 9, $k_{Li1}$ is the power generation power and offer data of the ith fourth trapezoidal fuzzy set, $k_{Li2}$ is the frequency modulation power and offer data in the ith fourth trapezoidal fuzzy set, and $k_{Li3}$ is the peak modulation power and offer data in the ith fourth trapezoidal fuzzy set, $k_{Li4}$ is the adjusted power and offer data in the ith fourth-trapezoidal fuzzy set, $k_{Lki}$ is the membership coefficient of the ith fourth-trapezoidal fuzzy set.

Optionally, determining a security detection value according to the first trapezoidal fuzzy set, and determining a false detection value according to the second trapezoidal fuzzy set, the third trapezoidal fuzzy set and the fourth trapezoidal fuzzy set comprises: determining a security detection value according to the first trapezoidal fuzzy set by means of a formula $$k_A = \frac{N_{AD}}{N_{ID} + N_{AD}},$$

wherein $k_A$ represents the security detection value and $k_A \geq 0$, $N_{TD}$ represents the quantity of real data sent by the marketing transaction agent to the Internet of Things, and $N_{AD}$ represents the first trapezoidal fuzzy set; determining a false detection fuzzy set by means of a formula $$N_{FD} = N_D \sum_{i=1}^{N_{RP}} \left( k_{eC}^t k_{LL}^t \sum_{i=1}^{9} E[k_{ei}] + k_{RC}^t k_{RL}^t \sum_{i=1}^{9} E[k_{Ri}] + k_{LC}^t k_{LL}^t \sum_{i=1}^{9} E[k_{L,i}] \right),$$

and determining a false detection value according to the formula $$k_F = \frac{N_{FD}}{N_{TD} + N_{FD}}$$

by means of the false detection fuzzy set, in which $N_{FD}$ represents the false detection fuzzy set, $N_D$ represents the quantity of data sent by the market transaction main body to the Internet of things, $k_{eC}^t$ is a first membership coefficient of the second trapezoid fuzzy set, $k_{eL}^t$ is a second membership coefficient of the second trapezoid fuzzy set, $E(k_{ei})$ is a mathematical expectation of the second trapezoid fuzzy set, $k_{RC}^t$ is a first membership coefficient of the third trapezoid fuzzy set, $k_{RL}^t$ is a second membership coefficient of the third trapezoid fuzzy set, $E(k_{Ri})$ is a mathematical expectation of the third trapezoid fuzzy set, $k_{LC}^t$ is a first membership coefficient of the fourth trapezoid fuzzy set, $k_{LL}^t$ is a second membership coefficient of the fourth trapezoid fuzzy set, $E(k_{Li})$ is a mathematical expectation of the fourth trapezoid fuzzy set, t is a t-th target time period, and t=1, 2, . . . , $N_{RP}$, $K_F$ represents the false detection value, and $k_F \geq 0$, $N_{FD}$ represents the quantity of false transaction data sent by the market deduction main body to the Internet of things.

Optionally, determining the security of market transaction Internet of Things data according to the security detection value and the false detection value comprises: in the case where both the security detection value and the false detection value are 0, determining that the market transaction Internet of Things data is secure; in the case where the security detection value is greater than 0 and the false detection value is 0, determining that there is a data attack on the market transaction Internet of Things data and there is no false data; and in the case where the security detection value is zero and the false detection value is greater than zero, determining that no data attack exists in the market transaction Internet of Things data and false data exists in the market transaction Internet of Things data.

Obviously, those skilled in the art should understand that the described modules and steps of the present invention can be realized by a universal computing device, They may be centralized on a single computing device or distributed on a network composed of a plurality of computing devices, They can be implemented by program codes executable by a computing device, and thus can be stored in a storage apparatus and executed by the computing device, Furthermore, in some cases, the shown or described steps may be executed in an order different from that described here, or they are made into integrated circuit modules respectively, or a plurality of modules or steps therein are made into a single integrated circuit module for implementation. Thus, the present invention is not limited to any specific combination of hardware and software.

Those skilled in the art shall understand that the embodiments of the present application can be provided as a method, a system or a computer program product. Therefore, the present disclosure may take the form of an entirely hardware embodiment, an entirely software embodiment or an embodiment combining software and hardware. Furthermore, the present application may take the form of a computer program product implemented on one or more computer-usable storage media (including but not limited to a disk memory, a CD-ROM, an optical memory, etc.) containing computer-usable program codes.

The present application is described with reference to the flowcharts and/or block diagrams of the method, device (system), and computer program product according to the embodiments of the present application. It should be understood that each flow and/or block in the flowcharts and/or block diagrams and combinations of flows and/or blocks in the flowcharts and/or block diagrams can be implemented by computer program instructions. These computer program instructions may be provided to a processor of a general purpose computer, a special purpose computer, an embedded processor or other programmable data processing apparatus to produce a machine, An apparatus that enables instructions executed by a processor of a computer or other programmable data processing devices to generate the functions specified in one or more processes in the flowcharts and/or one or more blocks in the block diagrams.

These computer program instructions may also be stored in a computer-readable memory capable of guiding a computer or other programmable data processing apparatuses to work in a specific manner, so that the instructions stored in the computer-readable memory generate a manufactured product comprising an instruction device, and the instruction device implements functions specified in one or more flows in the flowchart and/or one or more blocks in the block diagram.

These computer program instructions may also be loaded onto a computer or another programmable data processing device, causing a series of operational steps to be performed on a computer or other programmable apparatus to produce a computer implemented process, Thus, the instructions executed on the computer or other programmable devices provide steps for implementing the functions specified in one or more processes in the flowcharts and/or one or more blocks in the block diagrams.

In a typical configuration, the computing device includes one or more processors (CPUs), an input/output interface, a network interface, and memory.

The memory may include a non-permanent storage in a computer readable medium, a random access memory (RAM), and/or a non-volatile memory, such as a read-only memory (ROM) or a flash RAM. A memory is an example of a computer-readable medium.

Computer-readable media, including both persistent and non-persistent, removable and non-removable media, may implement information storage by any method or technology. The information may be computer readable instructions, data structures, modules of a program, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape magnetic disk storage or other magnetic storage devices, or any other non-transmission media, which may be used to store information that may be accessed by a computing device. As defined herein, computer-readable media does not include transitory computer-readable media, such as modulated data signals and carrier waves.

It should also be noted that the terms "include", "include", or any other variation thereof are intended to cover a non-exclusive inclusion, so that a process, a method, a commodity, or a device that includes a series of elements not only includes those elements, but also includes other elements that are not explicitly listed, or further includes inherent elements of the process, the method, the commodity, or the device. Without further limitation, an element limited by "include a . . . " does not exclude other same elements existing in a process, a method, a commodity, or a device that includes the element.

From the above description, it can be seen that the above embodiments of the present application achieve the following technical effects:

1) In the security detection method for market transaction Internet of Things data of the present application, a statistical analysis method is used to calculate a first trapezoidal fuzzy set having the number of attacks, a second trapezoidal fuzzy set having an error rate, a third trapezoidal fuzzy set having a repetition rate and a fourth trapezoidal fuzzy set having a deletion rate in data sent by a market transaction main body to an Internet of Things in a target time period; a security detection value is determined according to the first trapezoidal fuzzy set; a false detection value is determined according to the second trapezoidal fuzzy set, the third trapezoidal fuzzy set and the fourth trapezoidal fuzzy set; and the. In the prior art, there may be a security problem in market transaction data. In the present application, security detection is performed on market transaction Internet of Things data by calculating uncertain ambiguous sets, which can reflect the number of attacks on transmission data, a data error rate, a data repetition rate, a data deletion rate, etc., and accurately determine the security of market transaction Internet of Things data. Therefore, the problem of security of market transaction data in the prior art can be alleviated.

2) In the security detection device for market transaction Internet of Things data of the present application, a statistical analysis method is used to calculate a first trapezoid fuzzy set having the number of attacks, a second trapezoid fuzzy set having an error rate, a third trapezoid fuzzy set having a repetition rate and a fourth trapezoid fuzzy set having a deletion rate in data sent by a market transaction main body to an Internet of Things in a target time period; a security detection value is determined according to the first trapezoid fuzzy set; a false detection value is determined according to the second trapezoid fuzzy set, the third trapezoid fuzzy set and the fourth trapezoid fuzzy set; and the security of market transaction Internet of Things data is determined according to the security detection value and the false detection value. In the prior art, there may be a security problem in market transaction data. In the present application, security detection is performed on market transaction Internet of Things data by calculating uncertain ambiguous sets, which can reflect the number of attacks on transmission data, a data error rate, a data repetition rate, a data deletion rate, etc., and accurately determine the security of market transaction Internet of Things data. Therefore, the problem of security of market transaction data in the prior art can be alleviated.

The foregoing descriptions are merely exemplary embodiments of the present application, but are not intended to limit the present application. For those skilled in the art, the present application may have various modifications and variations. Any modifications, equivalent replacements, improvements and the like made within the spirit and principle of the present application shall belong to the scope of protection of the present application.

What is claimed is:

1. A method for detecting security of Internet of Things data of market transaction, comprising:
    calculating at least one first trapezoidal fuzzy set having a number of attacks of data, the data being sent by a market transaction main body within a target time period to Internet of Things;
    calculating at least one second trapezoidal fuzzy set of an error rate of the data;
    calculating at least one third trapezoidal fuzzy set of a repetition rate of the data;
    calculating at least one fourth trapezoidal fuzzy set of miss rate of the data;
    determining a security detection value according to the first trapezoidal fuzzy set;
    determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

2. The method for detecting security according to claim 1, wherein calculating the first trapezoidal fuzzy set having the number of attacks of data, comprises:
    calculating nine first trapezoidal fuzzy sets, the number of attacks of the nine first trapezoidal fuzzy set to low to high, of the number of attacks of the data sent by a marketing transaction entity to the Internet of Things within the target time period as $N_{ADi}=(N_{ADi1}, N_{ADi2}, N_{ADi3}, N_{ADi4}; k_{DAi})$, wherein i=1, 2, . . . 9, $N_{ADi}$ is an ith first trapezoidal fuzzy set having the number of attacks in the data sent by the market transaction main body to the Internet of Things, $N_{ADi1}$ is a power generation power and first offer data of the $i^{th}$ first trapezoidal fuzzy set, and $N_{ADi2}$ is a frequency modulation power and second offer data of the ith first trapezoidal fuzzy set, $N_{ADi3}$ is a peak modulation power and third offer data of the $i^{th}$ first trapezoidal fuzzy set, and $N_{ADi4}$ is a voltage regulation power and fourth offer data of the $i^{th}$ first trapezoidal fuzzy set, $k_{DAi}$ is a membership coefficient of the $i^{th}$ first trapezoidal fuzzy set.

3. The method for detecting security according to claim 1, wherein calculating the second trapezoidal fuzzy set of error rates of the data comprises:
    calculating the second trapezoidal fuzzy setting to low to high error rates of the data sent by a marketing transaction entity to the Internet of things within the target time period as $k_{ei}=(k_{ei1}, k_{ei2}, k_{ei3}, k_{ei4}; k_{eki})$, wherein i=1, 2, . . . 9, $k_{ei}$ is an ith second trapezoidal fuzzy set of an error rate in the data sent by the market transaction main body to the Internet of Things, $k_{ei1}$ is a power generation power and fifth offer data in the ith second trapezoidal fuzzy set, and $k_{ei2}$ is a frequency modulation power and sixth offer data in the ith second trapezoidal fuzzy set, $k_{ei3}$ is a peak tuning power and seventh offer data in the ith second trapezoidal fuzzy set, and $k_{ei4}$ is a peak tuning power and eighth offer data in the ith second trapezoidal fuzzy set, $k_{eki}$ is a membership coefficient of the ith second trapezoidal fuzzy set.

4. The method for detecting security according to claim 1, wherein calculating the third trapezoidal fuzzy set of the repetition rate of the data comprises:
    calculating the third trapezoidal fuzzy set with nine fuzzy uncertainties setting to low to high repetition rates of the data sent by a marketing transaction entity during the target time period to the Internet of things, as $k_{Ri}=(k_{Ri1}, k_{Ri2}, k_{Ri3}, k_{Ri4}; k_{Rki})$, wherein i=1, 2, . . . , 9, $k_{Ri}$ is an ith third trapezoidal fuzzy set of a repetition rate in the data sent by the market transaction main body to the Internet of Things, $k_{Ri1}$ is a power generation power and ninth offer data in the ith third trapezoidal fuzzy set, and $k_{Ri2}$ is a frequency modulation power and tenth offer data in the ith third trapezoidal fuzzy set, $k_{Ri3}$ peak modulation power and eleventh offer data in the ith said third trapezoidal fuzzy set, $k_{Ri4}$ is a peak modulation power and twelfth offer data in the ith said third trapezoidal fuzzy set, $k_{Rki}$ is a membership coefficient of the ith third trapezoidal fuzzy set.

5. The method for detecting security according to claim 1, wherein
calculating the fourth trapezoidal fuzzy set of miss rates of the data comprises:
calculating the fourth trapezoidal fuzzy set with a miss rate setting to low to high miss rates of the data sent by a marketing transaction entity during the target time period to the Internet of things as $k_{Li}=(k_{Li1}, k_{Li2}, k_{Li3}, k_{Li4}; k_{Lki})$, wherein i=1, 2, . . . , 9, $k_{Li1}$ is a power generation power and offer data of a ith fourth trapezoidal fuzzy set, $k_{Li2}$ is a frequency modulation power and offer data in a ith fourth trapezoidal fuzzy set, and $k_{Li3}$ is a peak modulation power and offer data in the ith fourth trapezoidal fuzzy set, $k_{Li4}$ is a regulated power and offer data in the ith fourth trapezoidal fuzzy set, and $k_{Lki}$ is a membership coefficient of the ith fourth trapezoidal fuzzy set.

6. The method for detecting security according to claim 1, wherein
determining the security detection value according to a first trapezoid ambiguity set, and determining the false detection value according to a second trapezoid ambiguity set, a third trapezoid ambiguity set, and a fourth trapezoid ambiguity set comprises:
determining the security detection value according to trapezoidal fuzzy formula $$k_A = \frac{N_{AD}}{N_{ID} + N_{AD}},$$

in which $k_A$ represents the security detection value and $k_A \geq 0$, $N_{TD}$ represents a quantity of real data sent by a marketing transaction entity to the Internet of things, and $N_{AD}$ represents the first trapezoidal fuzzy set;
determining a false detection fuzzy set by a formula $$N_{FD} = N_D \sum_{i=1}^{N_{RP}} \left( k_{eC}^t k_{LL}^t \sum_{i=1}^{9} E[k_{ei}] + k_{RC}^t k_{RL}^t \sum_{i=1}^{9} E[k_{Ri}] + k_{LC}^t k_{LL}^t \sum_{i=1}^{9} E[k_{L,i}] \right),$$

and determining the false detection value according to a formula $$k_F = \frac{N_{FD}}{N_{TD} + N_{FD}},$$

wherein $N_{FD}$ represents the false detection fuzzy set, $N_D$ represents a quantity of the data sent by the marketing transaction subject to the Internet of Things, $k_{eC}^t$ is a first membership coefficient of the second set of trapezoidal ambiguous sets, $k_{eL}^t$ is a second membership coefficient of the second set of trapezoidal ambiguous sets, $E(k_{ei})$ is a mathematical expectation of the second trapezoidal fuzzy set, $k_{RC}^t$ is a first membership coefficient of the third trapezoidal fuzzy set, $k_{RL}^t$ is a second membership coefficient of the third set of trapezoidal fuzzy values, $E(k_{Ri})$ is a mathematical expectation of the third set of trapezoidal fuzzy values, $k_{LC}^t$ is a first membership coefficient of the fourth set of trapezoidal ambiguous sets, $k_{LL}^t$ is a second membership coefficient of the fourth set of trapezoidal ambiguous sets, $E(k_{Li})$ is a mathematical expectation of the fourth trapezoidal fuzzy set, t is a t-th target time period and t=1, 2, . . . , $N_{RP}$, $K_F$ indicates the false detection value and $K_F>0$, elements of $N_{FD}$ indicate a quantity of false data sent to the Internet of Things by the market transaction body.

7. The method for detecting security according to claim 1, wherein determining the security of the Internet of Things data of the market transaction according to the security detection value and the false detection value comprises:
in a case that both the security detection value and the false detection value are 0, determining that the Internet of Things data of the market transaction is secure;
in a case that the security detection value is greater than 0 and the false detection value is 0, determining that there is a data attack in the Internet of Things data of the market transaction and there is no false data; and
in a case that the security detection value is zero and the false detection value is greater than zero, determining that no data attack exists in the Internet of Things data of the market transaction and false data exists in the Internet of Things data of the market transaction.

8. A computer readable storage medium, wherein the computer readable storage medium comprises a stored program, wherein when the program runs, on a computer, a device where the computer readable storage medium is located is controlled to execute a method for detecting security of Internet of Things data of market transaction comprises: calculating at least one first trapezoidal fuzzy set having a number of attacks of data, the data being sent by a market transaction main body within a target time period to Internet of Things; calculating at least one second trapezoidal fuzzy set of an error rate of the data; calculating at least one third trapezoidal fuzzy set of a repetition rate of the data; calculating at least one fourth trapezoidal fuzzy set of miss rate of the data; determining a security detection value according to the first trapezoidal fuzzy set; determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

9. The computer readable storage medium according to claim 8, wherein calculating the first trapezoidal fuzzy set having the number of attacks of data, comprises: calculating nine first trapezoidal fuzzy sets, the number of attacks of the nine first trapezoidal fuzzy set to low to high, of the number of attacks of the data sent by a marketing transaction entity to the Internet of things within the target time period as $N_{ADi}=(N_{ADi1}, N_{ADi2}, N_{ADi3}, N_{ADi4}; k_{DAi})$, wherein i=1, 2, . . . , 9, $N_{ADi}$ is an ith first trapezoidal fuzzy set having the number of attacks in the data sent by the market transaction main body to the Internet of Things, $N_{ADi1}$ is a power generation power and first offer data of the ith first trapezoidal fuzzy set, and $N_{ADi2}$ is a frequency modulation power and second offer data of the ith first trapezoidal fuzzy set, $N_{ADi3}$ is a peak modulation power and third offer data of the ith first trapezoidal fuzzy set, and $N_{ADi4}$ is a voltage regulation power and fourth offer data of the ith first trapezoidal fuzzy set, $k_{DAi}$ is a membership coefficient of the ith first trapezoidal fuzzy set.

10. The computer readable storage medium according to claim 8, wherein calculating the second trapezoidal fuzzy set of error rates of the data comprises: calculating the second trapezoidal fuzzy setting to low to high error rates of the data sent by a marketing transaction entity to the Internet of things within the target time period as $$k_{ei}=(k_{ei1},k_{ei2},k_{ei3},k_{ei4};k_{eki}),$$

wherein i=1, 2, . . . 9, $k_{ei}$ is an ith second trapezoidal fuzzy set of an error rate of the data sent by the market transaction main body to the Internet of Things, $k_{ei1}$ is a power generation power and offer data in the ith second trapezoidal fuzzy set, and $k_{ei2}$ is a frequency modulation power and offer data in the ith second trapezoidal fuzzy set, $k_{ei3}$ is a peak tuning power and offer data in the ith second trapezoidal fuzzy set, and $k_{ei4}$ is the peak tuning power and offer data in the ith second trapezoidal fuzzy set, $k_{eki}$ is a membership coefficient of the ith second trapezoidal fuzzy set.

11. The computer readable storage medium according to claim 8, wherein calculating the third trapezoidal fuzzy set of the repetition rate of the data comprises: calculating the third trapezoidal fuzzy set with nine fuzzy uncertainties setting to low to high repetition rates of the data sent by a marketing transaction entity during the target time period to the Internet of things, as $$k_{Ri}=(k_{Ri1},k_{Ri2},k_{Ri3},k_{Ri4};k_{Rki}),$$

wherein i=1, 2 . . . , 9, $k_{Ri}$ is an ith third trapezoidal fuzzy set of a repetition rate of the data sent by the market transaction main body to the Internet of Things, $k_{Ri1}$ is a power generation power and ninth offer data in the ith third trapezoidal fuzzy set, and $k_{Ri2}$ is a frequency modulation power and tenth offer data in the ith third trapezoidal fuzzy set, $k_{Ri3}$ peak modulation power and eleventh offer data in the ith said third trapezoidal fuzzy set, $k_{Ri4}$ is a peak modulation power and twelfth offer data in the ith said third trapezoidal fuzzy set, $k_{Rki}$ is a membership coefficient of the ith third trapezoidal fuzzy set.

12. The computer readable storage medium according to claim 8, wherein calculating the fourth trapezoidal fuzzy set of miss rates of the data comprises: calculating the fourth trapezoidal fuzzy setting to low to high miss rates of the data sent by a marketing transaction entity during the target time period to the Internet of things as $$k_{Li}=(k_{Li1},k_{Li2},k_{Li3},k_{Li4};k_{Lki}),$$

wherein i=1, 2, . . . 9, $k_{Li1}$ is a power generation power and thirteenth offer data of an ith fourth trapezoidal fuzzy set, $k_{Li2}$ is a frequency modulation power and fourteenth offer data in the ith fourth trapezoidal fuzzy set, and $k_{Li3}$ is a peak modulation power and fifteenth offer data in the ith fourth trapezoidal fuzzy set, $k_{Li4}$ is a regulated power and sixteenth offer data in the ith fourth trapezoidal fuzzy set, and $k_{Lki}$ is a membership coefficient of the ith fourth trapezoidal fuzzy set.

13. The computer readable storage medium according to claim 8, wherein determining the security detection value according to a first trapezoid ambiguity set, and determining the false detection value according to a second trapezoid ambiguity set, a third trapezoid ambiguity set, and a fourth trapezoid ambiguity set comprises: determining the security detection value according to trapezoidal a fuzzy formula $$k_A = \frac{N_{AD}}{N_{ID} + N_{AD}},$$

in which kA represents the security detection value and $k_A \geq 0$, $N_{TD}$ represents a quantity of real data sent by a marketing transaction entity to the Internet of things, and $N_{AD}$ represents the first trapezoidal fuzzy set; determining a false detection fuzzy set by a formula $$N_{FD} = N_D \sum_{i=1}^{N_{RP}} \left( k_{eC}^t k_{LL}^t \sum_{i=1}^{9} E[k_{ei}] + k_{RC}^t k_{RL}^t \sum_{i=1}^{9} E[k_{Ri}] + k_{LC}^t k_{LL}^t \sum_{i=1}^{9} E[k_{L,i}] \right),$$

and
determining the false detection value according to a formula $$k_F = \frac{N_{FD}}{N_{TD} + N_{FD}},$$

wherein $N_{FD}$ represents the false detection fuzzy set, $N_D$ represents a quantity of the data sent by the marketing transaction subject to the Internet of Things, $k_{eC}^t$ is a first membership coefficient of the second set of trapezoidal ambiguous sets, $k_{eL}^t$ is a second membership coefficient of the second set of trapezoidal ambiguous sets, $E(k_{ei})$ is a mathematical expectation of the second trapezoidal fuzzy set, $k_{RC}^t$ is a first membership coefficient of the third trapezoidal fuzzy set, $k_{RL}^t$ is a second membership coefficient of the third set of trapezoidal fuzzy values, $E(k_{Ri})$ is a mathematical expectation of the third set of trapezoidal fuzzy values, $k_{LC}^t$ is a first membership coefficient of the fourth set of trapezoidal ambiguous sets, $k_{LL}^t$ is a second membership coefficient of the fourth set of trapezoidal ambiguous sets, $E(k_{Li})$ is a mathematical expectation of the fourth trapezoidal fuzzy set, t is a t-th target time period and t=1, 2, . . . , $N_{RP}$, $K_F$ indicates the false detection value and $K_F > 0$, elements of $N_{FD}$ indicate a quantity of false data sent to the Internet of Things by the market transaction body.

14. The computer readable storage medium according to claim 8, wherein determining the security of the Internet of Things data of the market transaction according to the security detection value and the false detection value comprises: in a case that both the security detection value and the false detection value are 0, determining that the Internet of Things data of the market transaction is secure; in a case that the security detection value is greater than 0 and the false detection value is 0, determining that there is a data attack in the Internet of Things data of the market transaction and there is no false data; and in a case that the security detection value is zero and the false detection value is greater than zero, determining that no data attack exists in the Internet of Things data of the market transaction and false data exists in the Internet of Things data of the market transaction.

15. An electronic apparatus comprising: one or more processors, a memory, and one or more programs, wherein the one or more programs are stored in the memory and configured to be executed by the one or more processors, and the one or more programs comprise instructions for executing a method for detecting security of Internet of Things data of market transaction comprises: calculating at least one first trapezoidal fuzzy set having a number of attacks of data, the data being sent by a market transaction main body within a target time period to Internet of Things; calculating at least one second trapezoidal fuzzy set of an error rate of the data; calculating at least one third trapezoidal fuzzy set of a repetition rate of the data; calculating at least one fourth trapezoidal fuzzy set of miss rate of the data; determining a security detection value according to the first trapezoidal fuzzy set; determining a false detection value according to the second trapezoidal fuzzy set, the third trapezoidal fuzzy set and the fourth trapezoidal fuzzy set; and determining security of the Internet of Things data of the market transaction according to the security detection value and the false detection value.

16. The electronic apparatus according to claim 15, wherein calculating the first trapezoidal fuzzy set having the number of attacks of data, comprises:

calculating nine first trapezoidal fuzzy sets, the number of attacks of the nine first trapezoidal fuzzy set to low to high, of the number of attacks of the data sent by a marketing transaction entity to the Internet of things within the target time period as $$N_{ADi}=(N_{ADi1},N_{ADi2},N_{ADi3},N_{ADi4};k_{DAi}),$$

wherein i=1, 2, . . . , 9, $N_{ADi}$ is an ith first trapezoidal fuzzy set having the number of attacks in the data sent by the market transaction main body to the Internet of Things, $N_{ADi1}$ is a power generation power and first offer data of the $i^{th}$ first trapezoidal fuzzy set, and $N_{ADi2}$ is a frequency modulation power and second offer data of the $i^{th}$ first trapezoidal fuzzy set, $N_{ADi3}$ is a peak modulation power and third offer data of the $i^{th}$ first trapezoidal fuzzy set, and $N_{ADi4}$ is a voltage regulation power and fourth offer data of the $i^{th}$ first trapezoidal fuzzy set, $k_{DAi}$ is a membership coefficient of the ith first trapezoidal fuzzy set.

17. The electronic apparatus according to claim 14, wherein calculating the second trapezoidal fuzzy set of error rates of the data comprises: using a statistical analysis method to calculate the second trapezoidal fuzzy setting to low to high error rates of the data sent by a marketing transaction entity to the Internet of things within the target time period as $$k_{ei}=(k_{ei1},k_{ei2},k_{ei3},k_{ei4};k_{eki}),$$

wherein i=1, 2, . . . , 9, $k_{ei}$ is an ith second trapezoidal fuzzy set of an error rate of the data sent by the market transaction main body to the Internet of Things, $k_{ei1}$ is a power generation power and fifth offer data in the ith second trapezoidal fuzzy set, and $k_{ei2}$ is a frequency modulation power and sixth offer data in the ith second trapezoidal fuzzy set, $k_{ei3}$ is a peak tuning power and seventh offer data in the ith second trapezoidal fuzzy set, and $k_{ei4}$ is the peak tuning power and eighth offer data in the ith second trapezoidal fuzzy set, $k_{eki}$ is a membership coefficient of the ith second trapezoidal fuzzy set.

18. The electronic apparatus according to claim 15, wherein calculating the third trapezoidal fuzzy set of the repetition rate of the data comprises: calculating the third trapezoidal fuzzy set with nine fuzzy uncertainties setting to low to high repetition rates of the data sent by a marketing transaction entity during the target time period to the Internet of things, as $$k_{Ri}=(k_{Ri1},k_{Ri2},k_{Ri3},k_{Ri4};k_{Rki}),$$

wherein i=1, 2, . . . , 9, $k_{Ri}$ is an ith third trapezoidal fuzzy set of a repetition rate of the data sent by the market transaction main body to the Internet of Things, $k_{Ri1}$ is a power generation power and ninth offer data in the ith third trapezoidal fuzzy set, and $k_{Ri2}$ is a frequency modulation power and tenth offer data in the ith third trapezoidal fuzzy set, $k_{Ri3}$ peak modulation power and eleventh offer data in the ith said third trapezoidal fuzzy set, $k_{Ri4}$ is a peak modulation power and twelfth offer data in the ith said third trapezoidal fuzzy set, $k_{Rki}$ is a membership coefficient of the ith third trapezoidal fuzzy set.

* * * * *